United States Patent
Furuya et al.

(10) Patent No.: US 11,273,635 B2
(45) Date of Patent: Mar. 15, 2022

(54) LIQUID EJECTING DEVICE AND LIQUID EJECTING METHOD

(71) Applicant: MIMAKI ENGINEERING CO., LTD., Nagano (JP)

(72) Inventors: Chika Furuya, Nagano (JP); Wataru Hioki, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 0 days.

(21) Appl. No.: 16/585,807

(22) Filed: Sep. 27, 2019

(65) Prior Publication Data

US 2020/0101718 A1 Apr. 2, 2020

(30) Foreign Application Priority Data

Oct. 2, 2018 (JP) .............................. JP2018-187444

(51) Int. Cl.
*B41J 2/045* (2006.01)

(52) U.S. Cl.
CPC ......... *B41J 2/0451* (2013.01); *B41J 2/04586* (2013.01)

(58) Field of Classification Search
None
See application file for complete search history.

(56) References Cited

U.S. PATENT DOCUMENTS

| 9,573,382 | B1 | 2/2017 | Metcalfe |
| 2005/0083361 | A1 | 4/2005 | Nakanishi et al. |
| 2013/0215178 | A1* | 8/2013 | Ueshima .................... B41J 2/12 347/14 |
| 2015/0202862 | A1 | 7/2015 | Tamai |
| 2015/0258785 | A1 | 9/2015 | Sudo et al. |
| 2016/0193829 | A1 | 7/2016 | Yamanobe |

OTHER PUBLICATIONS

Extended European Search Report (EESR) dated Feburuary 13, 2020 issued in the corresponding European Patent Application No. 19200717.7.

* cited by examiner

*Primary Examiner* — Erica S Lin
(74) *Attorney, Agent, or Firm* — Rankin, Hill & Clark LLP

(57) ABSTRACT

An liquid ejecting device includes an inkjet head, a scanning driving unit, a storage, an influence degree storage that stores influence degree information, and a control unit. The influence degree information indicates a magnitude of an influence generated at one ejection position by forming dots of the liquid at each of a plurality of ejection positions. The control unit causes other nozzles to eject a larger amount of liquid than at a normal time with respect to at least a part of the ejection position where the liquid is ejected by the other nozzles in the vicinity of an abnormal nozzle at the time of main scan, and selects an ejection position to which the other nozzle ejects a larger amount of the liquid than the normal time based on the influence degree information.

8 Claims, 12 Drawing Sheets

Original image

Nozzle missing image

Image after recovery

Recovery range: 3 × 3 pixels

Recovery range: 3 × 5 pixels

⇩　⇩　⇩

Influence degree matrix　　Priority rank matrix

| 2 | 1 | 2 |
|---|---|---|
| 2 | x |   |
| 2 | 1 | 2 |

| 5 | 1 | 3 |
|---|---|---|
|   | x |   |
| 4 | 2 | 6 |

FIG. 8A
| 9 | 3 | 11 |
|---|---|----|
| 7 | 1 | 5  |
| 0 | x | 0  |
| 6 | 2 | 8  |
| 12| 4 | 10 |
FIG. 8B
Region of influence degree 1
|   |   |   |
|---|---|---|
|   | 1 |   |
| 0 | x | 0 |
|   | 2 |   |
|   |   |   |
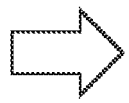
Region of influence degree 2
|   | 3 |   |
|---|---|---|
|   | 1 |   |
| 0 | x | 0 |
|   | 2 |   |
|   |   |   |
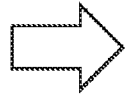
Region of influence degree 2
|   | 3 |   |
|---|---|---|
|   | 1 |   |
| 0 | x | 0 |
|   | 2 |   |
|   | 4 |   |
Region of influence degree 3
|   | 3 |   |
|---|---|---|
|   | 1 | 5 |
| 0 | x | 0 |
|   | 2 |   |
|   | 4 |   |

Case of no missing of nozzle

Coverage = 30
→ target coverage

Case of missing of nozzle

Coverage = 27.8

Process at location of influence degree 1

Before recovery  →  n=1  →  n=2  •••  After all are L, recovery at location of influence degree 2

Proceed to location of influence degree 2

Process at location of influence degree 2 n=3  •••  n=6  •••  Repeat until coverage exceeds original image

LIQUID EJECTING DEVICE AND LIQUID EJECTING METHOD

CROSS REFERENCE TO RELATED APPLICATIONS

This application claims the priority benefit of Japanese Patent Application No. 2018-187444, filed on Oct. 2, 2018. The entirety of the above-mentioned patent application is hereby incorporated by reference herein and made a part of this specification.

TECHNICAL FIELD

The present disclosure relates to a liquid ejecting device and a liquid ejecting method.

DESCRIPTION OF THE BACKGROUND ART

Various methods have been conventionally proposed for an inkjet recording apparatus to suppress degradation of image quality caused by ejection failure of an ink from a nozzle. For example, Japanese Unexamined Patent Publication No. 2017-13284 discloses a method of complementary control in which complementary ejection is performed by a nearby nozzle so as to compensate for the amount of ink not ejected by an abnormal nozzle (defective nozzle).

SUMMARY

In the complementary control disclosed in the configuration of Japanese Unexamined Patent Publication No. 2017-13284, when there is amount of misalignment between the amount of ink not ejected in one recording operation and the change amount in the amount of ejection ink by the nearby nozzle, the amount of misalignment is added to the amount of ink which is not ejected to define the change amount in the amount of ejection ink in the complementary ejection in the complementary control related to the recording operation to be performed next. However, in this case, it is sometimes difficult to sufficiently suppress the influence of the presence of the abnormal nozzle only by simply considering the amount of misalignment of the amount of ink and the like. Therefore, it is conventionally desired to more appropriately suppress the influence of the presence of the abnormal nozzle when the abnormal nozzle is present. The present disclosure thus provides a liquid ejecting device and a liquid ejecting method capable of overcoming such problem.

In a case where an abnormal nozzle is present and the amount of ink is compensated using nearby nozzles, normally, a nozzle that ejects the ink to an ejection position different from the original ejection position by the abnormal nozzle is used as a nearby nozzle. Then, in this case, for example, it may be considered to adjust the ejection amount by the adjacent nozzle so that the total amount of ink ejected with respect to a unit area is about the same as that in normal time. However, in this case, since the amount of ink to an ejection position different from the original ejection position of the abnormal nozzle is adjusted, the influence of the abnormal nozzle may not be sufficiently reduced even if the total amount of ink is simply combined. On the other hand, the inventors of the present application considered adjusting the ejection amount by the nozzle near the abnormal nozzle in consideration of the influence degree between the ejection positions rather than simply combining the total amount of ink. According to this configuration, for example, the influence of the abnormal nozzle can be more appropriately reduced as compared with the case where the total amount of ink is simply combined.

Furthermore, the inventors of the present application found the features necessary for obtaining such effects through further intensive research, and have contrived the present disclosure. In order to solve the problems described above, the present disclosure provides a liquid ejecting device that ejects liquid through an inkjet method, the liquid ejecting device including an inkjet head having a plurality of nozzles arranged with positions in a predetermined nozzle row direction shifted from each other; a scanning driving unit that causes the inkjet head to perform a main scan of ejecting the liquid while relatively moving in a main scanning direction that intersects the nozzle row direction with respect to a liquid ejecting target; an influence degree storage that stores influence degree information indicating an influence degree that occurs among a plurality of ejection positions where the liquid is ejected in one main scan; and a control unit that controls operations of the inkjet head and the scanning driving unit; where the influence degree storage stores, as the influence degree information, information indicating a magnitude of an influence generated at one ejection position by forming dots of the liquid at each of a plurality of ejection positions in a periphery of the one ejection position in association with each of the plurality of ejection positions in the periphery; when an abnormal nozzle, which is the nozzle having an abnormal ejection characteristic, is present, the control unit causes other nozzles to eject a larger amount of liquid than at a normal time when the abnormal nozzle is not present with respect to at least a part of the ejection position where the liquid is ejected by the other nozzles in a vicinity of the abnormal nozzle at the time of main scan; and the control unit selects an ejection position to which the other nozzle ejects a larger amount of the liquid than the normal time based on the influence degree information stored in the influence degree storage.

When configured in this manner, for example, the ejection position to which a larger amount of liquid is ejected by the other nozzle can be appropriately selected in consideration of the influence degree on the original ejection position of the abnormal nozzle. In this case, the original ejection position of the abnormal nozzle is the ejection position where the liquid should have been ejected if the abnormal nozzle was a normal nozzle. The original ejection position of the abnormal nozzle can be defined, for example, as an abnormal nozzle corresponding position which is an ejection position corresponding to the abnormal nozzle. According to this configuration, for example, the influence of the abnormal nozzle can be more appropriately reduced as compared with the case where the total amount of ink is simply combined.

Furthermore, in this configuration, the scanning driving unit causes the inkjet head to perform the main scan such that, for example, one main scan is performed with respect to each position of the liquid ejecting target. In such a case as well, the influence of the abnormal nozzle can be appropriately reduced by changing the amount of liquid ejected from the other nozzles as described above. In this case, the liquid ejected from the inkjet head is, for example, an ink used for printing. In this case, the liquid ejecting device can be considered, for example, as a printing apparatus that performs printing by ejecting ink to the medium.

Moreover, in this configuration, it is conceivable to use at least a nozzle adjacent to the abnormal nozzle as the other nozzle in the vicinity of the abnormal nozzle. In this case, it is preferable to use a plurality of nozzles including a nozzle adjacent to the abnormal nozzle as the other nozzles. More specifically, as the other nozzle, for example, it is preferable to use two or more nozzles on one side and two or more nozzles on the other side in the nozzle row direction with respect to the abnormal nozzle. In addition, as for the other nozzle, for example, it is also conceivable to use a nozzle that can eject liquid to an ejection position that affects the original ejection position of the abnormal nozzle.

Moreover, in this configuration, it is conceivable to use, for example, an inkjet head in which the volume of the liquid (liquid droplet) ejected from the nozzle can be changed in a plurality of stages as the inkjet head. In this case, the control unit changes the stage corresponding to the volume of the liquid to be ejected by the other nozzle to the ejection position where the ejection amount of the liquid is to be increased, for example, to the stage corresponding to a larger volume to cause the other nozzle to eject a larger amount of liquid than that in the normal time. With this configuration, for example, the amount of liquid to be ejected by the other nozzle can be appropriately adjusted.

In this configuration, the control unit causes each of the nozzles of the inkjet head to eject the liquid based on, for example, a raster image indicating the ejection position of the liquid. Then, when an abnormal nozzle is present, for example, the control unit causes other nozzles to eject a larger amount of liquid than at a normal time with respect to a part of the ejection position where the liquid is ejected by the other nozzles in a main scan by correcting a raster image based on the influence degree information and causing each of the nozzles to eject liquid based on the corrected raster image.

Further, in this configuration, with regard to the amount of liquid to be discharged to the other nozzles, for example, with regard to the total discharge amount of the liquid within a predetermined range including the original ejection position at the abnormal nozzle, the total discharge after adjustment. It is conceivable to adjust the amount so as to approach the total discharge amount at the normal time. Furthermore, when the abnormal nozzle is present, for example, the control unit does not cause the abnormal nozzle to eject the liquid and causes the other nozzle to eject the liquid of a larger amount than the normal time to a part of the ejection position where the liquid can be ejected by the other nozzle in the main scan. With this configuration, for example, the influence of the abnormal nozzle can be more appropriately reduced.

Furthermore, in this case, for example, a process for determining the amount of liquid to be ejected in a larger amount than at the normal time by the other nozzles to the ejection position in the periphery of the original ejection position (abnormal nozzle corresponding position) by the abnormal nozzle, for example, can be considered as a recovery process for reducing the influence of the abnormal nozzle. Furthermore, in this case, a range for adjusting the ejection amount of the liquid from the other nozzles can be considered as a recovery range. Then, in this case, when the above-described predetermined for calculating the total ejection amount of the liquid is defined as a coverage calculation range, the coverage calculation range is preferably made larger than the recovery range. With this configuration, for example, the total amount of liquid after recovery process can be appropriately prevented from becoming excessively large.

More specifically, in this case, for example, it is conceivable to use a nozzle other than the abnormal nozzle among N (N is an integer greater than or equal to two) nozzles arranged continuously including the abnormal nozzle in a nozzle row in which the plurality of nozzles are arranged as the other nozzle in the vicinity of the abnormal nozzle; Furthermore, in this case, the recovery range can be considered as a range in which the liquid is ejected by such other nozzles in the periphery of the original ejection position of the abnormal nozzle. In this case, for example, when a total amount of ink ejected within a predetermined range in the main scanning direction by M (M is an integer greater than or equal to two) nozzles arranged continuously including the abnormal nozzle in the nozzle row is defined as an in-range total ejection amount, the coverage calculation range can be considered as a range in which the in-range total ejection amount is calculated. In this case, for example, the coverage calculation range can be made larger than the recovery range by setting M to an integer greater than N.

Moreover, in this case, for example, the in-range total ejection amount can be considered as a coverage calculated with respect to the coverage calculation range. Furthermore, in this case, considering that the coverage calculation range and the recovery range are associated with each other, the in-range total ejection amount can also be considered as the coverage or the like associated with the recovery range. In addition, in this configuration, for example, when the in-range total ejection amount at the normal time is defined as a normal time ejection amount, and the in-range total ejection amount in a state the amount of liquid to be ejected by the other nozzle when the abnormal nozzle is present is adjusted is defined as a post-adjustment ejection amount, for example, the control unit adjusts the amount of the liquid to be ejected by the other nozzle so that the post-adjustment ejection amount approaches the normal time ejection amount. According to such a configuration, for example, the recovery process can be appropriately performed.

Furthermore, in this configuration, it is conceivable to use an influence degree matrix which is matrix-like data indicating the influence degree as the influence degree information. Moreover, for example, it is conceivable to use a matrix and the like in which a numerical value indicating the influence degree on the original ejection position of the abnormal nozzle is defined with respect to a plurality of ejection positions centered on the original ejection position of the abnormal nozzle as the influence degree matrix.

More specifically, as the influence degree information, for example, consideration is made to use information associating any one of the influence degree among a plurality of types of influence degrees different in the magnitude of influence with respect to each of a plurality of ejection positions in a periphery of the one ejection position for the magnitude of the influence generated at the one ejection position. Then, when the abnormal nozzle is present, for example, the control unit preferentially selects an ejection position associated with the influence degree indicating a larger influence of the plurality of ejection positions in the periphery of the original ejection position of the abnormal nozzles based on the influence degree information. Furthermore, the control unit causes the other nozzle to eject a larger amount of liquid than at the normal time to the selected ejection position. According to this configuration, for example, the amount of liquid ejected by other nozzles can be increased preferentially and appropriately with respect to the ejection position having a larger influence on the original ejection position of the abnormal nozzle. This makes it possible to more appropriately reduce, for example, the influence of an abnormal nozzle.

Furthermore, the influence degree information is considered to include, as a plurality of ejection positions each associated with any one of the influence degrees in the influence degree information, a plurality of ejection positions associated with a first influence degree which is the influence degree indicating a largest influence among the plurality of types of the influence degree, and an ejection position associated with a second influence degree indicating an influence smaller than the first influence degree. When the abnormal nozzle is present, for example, the control unit preferentially selects an ejection position associated with the first influence degree among a plurality of ejection positions in the periphery of the ejection position where the liquid is ejected by the abnormal nozzle based on the influence degree information, and the control unit changes a stage indicating a volume of the liquid to be ejected to at least a part of the ejection position associated with the first influence degree to a larger stage than at the normal time. With regards to the ejection position associated with the second influence degree, for example, the volume of the liquid is greatly changed only after the volume of the liquid to be ejected to the ejection position associated with the first influence degree is changed to a maximum stage. Thus, for example, when the volume of the liquid to be ejected to all the ejection positions associated with the first influence degree is changed to a maximum stage, and the volume of the liquid to be ejected to other ejection positions is further increased, the control unit changes a stage indicating a volume of the liquid to be ejected to at least a part of the ejection position associated with the second influence degree to a larger stage than at the normal time. According to this configuration, for example, the amount of liquid can be increased preferentially and more appropriately with respect to the ejection position having a large influence degree.

Furthermore, in this configuration, for example, the same influence degree may be associated with a plurality of ejection positions. Therefore, it is preferable that the influence degree storage further stores priority information indicating priority of selection with respect to a plurality of ejection positions associated with the same influence degree. In this case, when the abnormal nozzle is present, for example, the control unit selects, based further on the priority information, an ejection position to which the other nozzle ejects the liquid in an amount larger than at the normal time. With this configuration, for example, even when the same influence degree is associated with a plurality of ejection positions, the ejection position to increase the amount of liquid can be more appropriately selected. In this case, it is conceivable to use, for example, a priority rank matrix which is matrix-like data indicating the priority rank as the priority as the priority information. Moreover, for example, it is conceivable to use a matrix and the like in which a numerical value indicating the priority rank (e.g., order of selection, etc.) on a plurality of ejection positions centered on the original ejection position of the abnormal nozzle is defined as the priority rank matrix.

In this configuration, when an abnormal nozzle is present, for example, the control unit performs the recovery process on each of the original ejection positions of the abnormal nozzle (each of a plurality of abnormal nozzle corresponding positions). Then, in this case, for example, if the manner of selecting the ejection position performed based on the priority information is uniform, the influence of the manner of selecting the ejection position may arise in the state after the ejection of the ink (e.g., printing result etc.). Thus, for example, the manner of selecting the ejection position based on the priority information is preferably changed every time recovery process corresponding to a preset number of abnormal nozzle corresponding positions is performed (every time recovery process of a preset number of times is performed). With this configuration, for example, the selection of the ejection position performed based on the priority information can be more appropriately performed. Furthermore, in this case, for example, it is conceivable to reverse the priority rank matrix upside down (or right and left) for changing the manner of selecting the ejection position performed based on the priority information. In this case, the manner of selecting the ejection position is preferably changed each time one recovery process is performed.

Use of a liquid ejecting method having the features similar to the above, and the like can be considered for the configuration of the present disclosure. In this case as well, for example, effects similar to the above can be obtained.

According to the present disclosure, for example, the influence of an abnormal nozzle can be more appropriately reduced.

BRIEF DESCRIPTION OF THE DRAWINGS

FIG. 1A shows one example of a configuration of a main part of the printing apparatus 10. FIG. 1B shows one example of a configuration of a head unit 12 in the printing apparatus 10.

FIG. 2A shows an example of a volume of ink that can be ejected from the nozzles in an inkjet head 102 for each color. FIG. 2B shows an example of the arrangement of ink dots formed in one main scan at the normal time when an abnormal nozzle is not present. FIG. 2C shows an example of the arrangement of ink dots formed in one main scan in a case where a recovery process is not performed when an abnormal nozzle is present.

FIG. 3A shows an example of an original image printed when an abnormal nozzle is not present. FIG. 3B shows an example of a nozzle missing image to be printed when an abnormal nozzle is present. FIG. 3C shows an example of a recovery image printed by performing the recovery process.

FIG. 4A shows an example of a recovery range. FIG. 4B shows an example of a coverage corresponding to ink dots of each size. FIG. 4C shows an example of an influence degree matrix and a priority rank matrix.

FIG. 5A shows an example of a manner of increasing the dot size. FIG. 5B shows a relationship between a recovery range and a coverage calculation range in the present example.

FIGS. 7A and 7B show examples of the relationship between the resolution of printing and the size of the ink dot. FIG. 7C shows an example of the relationship between the L dot model and the influence degree matrix.

FIGS. 8A and 8B are views describing the priority rank matrix in more detail. FIG. 8A is a view showing an example of the priority rank matrix. FIG. 8B shows an example of a manner of generating the priority rank matrix.

FIG. 12A is a graph showing an example of the relationship between the manner of increasing the dot size and the printing result.

FIG. 12B is a graph showing the results of an experiment on the coverage calculation range.

DETAILED DESCRIPTION OF EMBODIMENTS

Figure 1A:
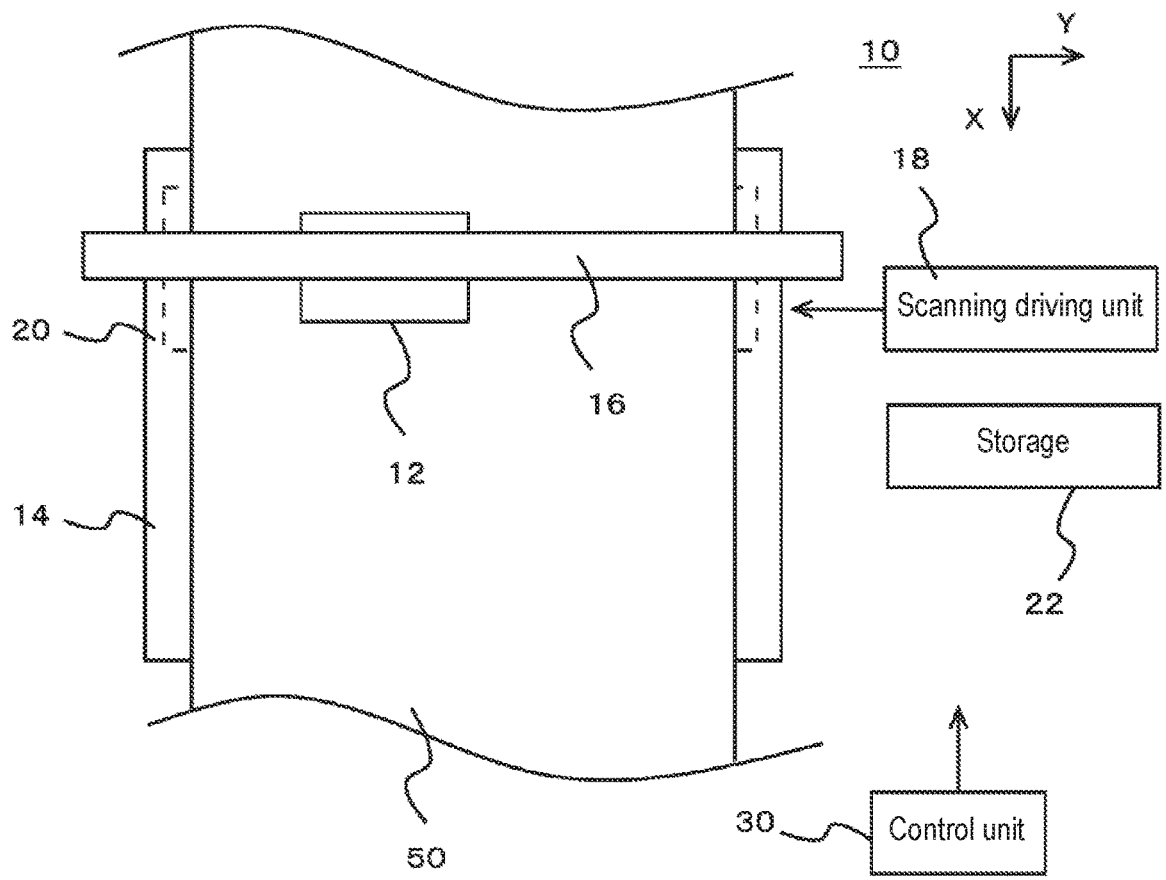
FIGS. 1A and 1B are views describing a printing apparatus 10 according to one embodiment of the present disclosure.
Figure 1B:
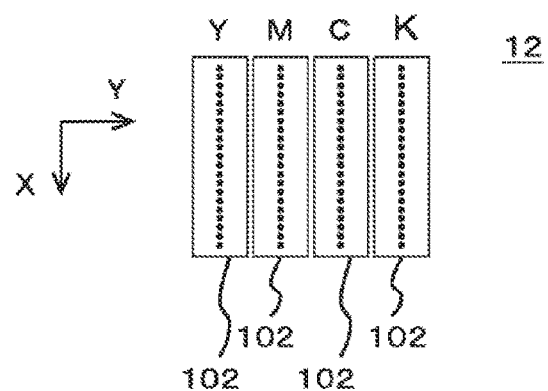

Hereinafter, an embodiment according to the present disclosure will be described with reference to the drawings. FIGS. 1A and 1B are views describing a printing apparatus 10 according to one embodiment of the present disclosure. FIG. 1A shows one example of a configuration of a main part of the printing apparatus 10. FIG. 1B shows one example of a configuration of a head unit 12 in the printing apparatus 10. Note that, except for the points described below, the printing apparatus 10 may have features same as or similar to the known inkjet printers. For example, the printing apparatus 10 may further have a configuration same as or similar to a known inkjet printer, in addition to the configuration described below.

The printing apparatus 10 is an example of a liquid ejecting device that ejects liquid through an inkjet method, and performs printing through the inkjet method on a medium (media) 50 to be printed. In this case, the medium 50 is an example of an ink ejecting target. Furthermore, the ink is, for example, liquid ejected from an inkjet head. The inkjet head is, for example, an ejection head that ejects liquid through the inkjet method. The ink can also be considered as, for example, a functional liquid or the like ejected by a liquid ejecting device.

More specifically, in the present example, the printing apparatus 10 includes the head unit 12, a platen 14, a guide rail 16, a scanning driving unit 18, a heater 20, a storage 22, and a control unit 30. The head unit 12 is a part that ejects the ink to the medium 50, and for example, includes a plurality of inkjet heads 102, as shown in FIG. 1B. In this case, each inkjet head 102 is an inkjet head that ejects the ink of each color to use for printing. Each of the plurality of inkjet heads 102 includes a nozzle row in which a plurality of nozzles for ejecting ink to the medium 50 are arranged, and ejects inks having different colors from each other. Furthermore, the plurality of nozzles in each of the inkjet heads 102 are arranged with their positions in a predetermined nozzle row direction shifted from one another. When referring to arranging with their positions in a nozzle row direction shifted from one another, this means, for example, that the positions are shifted from one another when focusing only on the positions in the nozzle row direction and ignoring the positions in a direction orthogonal to the nozzle row direction. More specifically, in the present example, the nozzle row direction is a direction parallel to the sub scanning direction (X direction in the figure) preset in the printing apparatus 10. Moreover, in each of the inkjet heads 102, the plurality of nozzles form a nozzle row by being arranged so that the intervals in the sub scanning direction become constant.

In the present example, the head unit 12 includes the plurality of inkjet heads 102, each of which ejects ink of each color of yellow (Y), magenta (M), cyan (C), and black (K). As shown in the figure, the plurality of inkjet heads 102 are arranged side by side in a main scanning direction (Y direction in the figure) orthogonal to the sub scanning direction with the positions in the sub scanning direction aligned. In this case, the main scanning direction is an example of a direction intersecting the nozzle row. Furthermore, in the head unit 12, for example, a plurality of inkjet heads 102 are held by a carriage (not shown). In addition, as the inkjet head 102 for each color, an inkjet head that can change the volume of ink to be ejected from a nozzle in a plurality of stages is used. The feature that the volume of ink can be changed will be described in more detail later. Moreover, in the present example, an evaporation-drying type ink which is an ink that fixes to the medium 50 by evaporating the solvent is used as the ink of each color. In a modified example of a configuration of the printing apparatus 10, for example, an ultraviolet-curable ink which is cured by irradiation of ultraviolet light may be used.

The platen 14 is a table-shaped member that supports the medium 50 at a position facing the head unit 12. The guide rail 16 is a rail-like member extending in the main scanning direction, and guides the movement of the head unit 12 in the main scanning direction.

The scanning driving unit 18 is a driving unit that causes the head unit 12 to perform a scanning operation of relatively moving with respect to the medium 50. In this case, causing the head unit 12 to perform a scanning operation means, for example, causing the respective inkjet heads 102 of the head unit 12 to perform a scanning operation. Furthermore, in the present example, the scanning driving unit 18 causes the head unit 12 to perform a main scan and a sub scan as the scanning operation. The main scan is, for example, an operation (scanning operation) of ejecting ink while moving in the main scanning direction. Furthermore, at the time of the main scan, the scanning driving unit 18 moves the head unit 12 along the guide rail 16. Moreover, regarding the main scan, the movement of the head unit 12 in the main scanning direction is a relative movement with respect to the medium 50. Therefore, in the modified example of a configuration of the printing apparatus 10, the medium 50 side may be moved by fixing the position of the head unit 12 and moving, for example, the platen 14.

Furthermore, the sub scan is, for example, an operation of relatively moving with respect to the medium 50 in the sub scanning direction. In the present example, the scanning driving unit 18 causes the head unit 12 to perform the sub scan by conveying the medium 50 in a conveyance direction parallel to the sub scanning direction using, for example, a roller (not shown). Furthermore, in this case, the medium 50 is conveyed by a preset feed amount between each main scan. Moreover, in the present example, the printing apparatus 10 executes the printing operation through a serial method by causing the head unit 12 to perform the main scan and the sub scan. In this case, the printing operation is executed by a one-pass operation of setting the pass number to one. The pass number is, for example, the number of main scans performed on the same position in the medium 50. Furthermore, the operation of one pass can be considered as, for example, an operation in which only one main scan is performed with respect to each position of the medium 50.

The heater 20 is a heating unit for evaporating the solvent in the ink. In the present example, the heater 20 is disposed in the platen 14 at a position facing the head unit 12 with the medium 50 therebetween, and volatilizes and removes the solvent in the ink by heating the medium 50. Furthermore, in the present example, the heater 20 is an example of an ink fixing unit. For example, in a case where an ink other than the evaporation-drying type is used in a modified example of a configuration of the printing apparatus 10, it is conceivable to use a unit corresponding to the characteristics of the ink as the fixing unit. More specifically, for example, when using an ultraviolet-curable ink, it is conceivable to use an ultraviolet light source such as a UV LED as a fixing unit. In this case, for example, the ultraviolet light source may be disposed at a position adjacent to the inkjet head 102 in the head unit 12.

The storage 22 is a storage unit that stores various parameters and the like specifying the printing operation. Furthermore, in the present example, the storage 22 is an example of an influence degree storage, and stores at least parameters used in a recovery process. In this case, the recovery process is, for example, a process for suppressing the influence of the presence of an abnormal nozzle when an abnormal nozzle is present. An abnormal nozzle is a nozzle in which the ejection characteristic is abnormal. Moreover, the abnormal nozzle can also be considered as, for example, a nozzle whose ejection characteristic is deviated from a preset normal range. More specifically, in the present example, the storage 22 stores an influence degree matrix and a priority rank matrix as parameters to use in the recovery process. Details of the influence degree matrix and the priority rank matrix, and recovery process performed using the same will be described in more detail later.

The control unit 30 is, for example, a CPU of the printing apparatus 10, and controls the operation of each unit of the printing apparatus 10. More specifically, the control unit 30 causes each nozzle in the head unit 12 to eject ink according to an image to be printed, for example, at the time of control of the main scan by the head unit 12. Furthermore, as will be described in more detail later, in the present example, the control unit 30 further performs control of the recovery process performed using the influence degree matrix and the priority rank matrix. According to the present example, for example, various images can be appropriately printed by the printing apparatus 10.

Figure 2A:
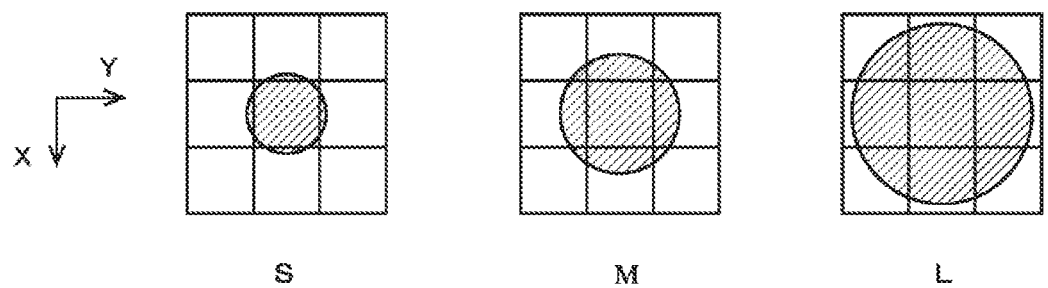
FIGS. 2A to 2C are views explaining a volume of ink and an influence of an abnormal nozzle.
Figure 2B:
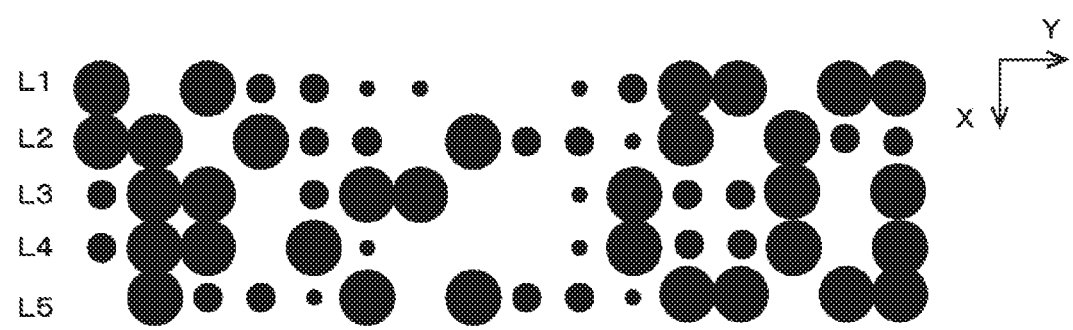
Figure 2C:
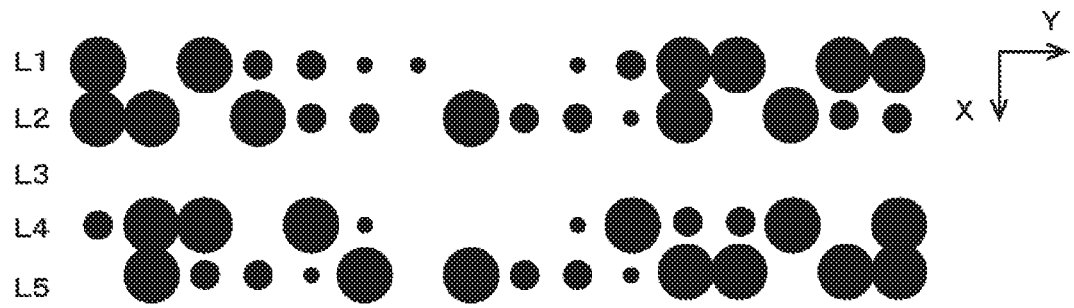

Now, the recovery process performed in the present example will be described. For the sake of convenience of explanation, first, the volume of ink that can be ejected from the nozzles in the inkjet head 102 for each color, the influence when an abnormal nozzle is present (influence of abnormal nozzle) and the like will be described. FIGS. 2A to 2C are views explaining the volume of ink and the influence of the abnormal nozzle. FIG. 2A shows an example of a volume of ink that can be ejected from the nozzles in an inkjet head 102 for each color. As described above, in the present example, an inkjet head capable of changing the volume of ink to be ejected from the nozzle in a plurality of stages is used as the inkjet head 102 for each color. More specifically, in the present example, the inkjet head 102 can eject the ink from each of the nozzles in three types of volumes of S (small), M (medium), and L (large) as shown in the figure. In this case, four types of values (four values) can be represented by one nozzle by including a state in which ink is not ejected from the nozzle. Furthermore, as such an inkjet head 102, a known inkjet head (multi-valued head) in which the volume of ink can be varied in a plurality of stages can be suitably used.

Furthermore, in FIG. 2A, regarding the volume of ink, the sizes of the ink dots formed by each volume of S, M, and L are shown overlapping the squares corresponding to the resolution of printing. The size of the ink dot formed with each volume of S, M, L means the size of the ink dot formed with each of the three types of volumes S, M, L (three types of sizes S, M, L). Furthermore, in the figure, each square corresponds to one ejection position. Moreover, each square can be considered as, for example, a range of pixels set according to the resolution of printing. Furthermore, the squares (nine squares) corresponding to the resolution of printing shown in the figure can be considered as an example of the ejection position set according to the resolution of printing. Furthermore, among these squares, the central square indicates an ejection position to which ink is ejected at the time of forming each dot. Moreover, squares other than the central square indicate the ejection positions in the periphery of the ejection position corresponding to the central square. In addition, in the present example, as can be seen from the sizes of the dots shown in the figure, a dot having a size that comes into contact with the ink dot formed at the adjacent ejection position is formed as the ink dot of each size. In this case, the adjacent ejection position is, for example, an ejection position adjacent in each of the main scanning direction and sub scanning direction. Furthermore, in a modified example of a configuration of the printing apparatus 10, for example, only the dots of some sizes may have sizes that come into contact with the ink dots formed at the adjacent ejection positions. In this case, it is preferable that at least the dots of some sizes have sizes that come into contact with the ink dots formed at the ejection positions adjacent at least in the sub scanning direction.

Furthermore, in the present example, the recovery process is performed using such a feature that the volume of ink can be changed. More specifically, when one of the nozzles in any one of the inkjet heads 102 is an abnormal nozzle, the control unit 30 (see FIGS. 1A and 1B) of the printing apparatus 10 controls the operation of the scanning driving unit 18 (see FIGS. 1A and 1B) so that the main scan is performed without using the abnormal nozzle. In this case, the influence that may occur when the abnormal nozzle is caused not to eject ink is suppressed by causing any other nozzle other than the abnormal nozzle to eject an amount of ink larger than that in the normal time which is when the abnormal nozzle is not present. According to such a configuration, for example, the ink can be ejected by the other nozzles in place of the abnormal nozzle by increasing the ejection amount of the other nozzles other than the abnormal nozzle. Thus, the recovery process can be appropriately performed in a case where an abnormal nozzle is present. The recovery process performed in the present example will be described later in more detail. Furthermore, before describing the operation of the recovery process in detail, an example of the influence of the abnormal nozzle will be described below with reference to FIGS. 2B and 2C.

FIG. 2B shows an example of the arrangement of ink dots formed in one main scan at the normal time when an abnormal nozzle is not present. FIG. 2C shows an example of the arrangement of ink dots formed in one main scan in a case where a recovery process is not performed when an abnormal nozzle is present. In FIGS. 2B and 2C, the ink dots are shown somewhat smaller in order to reduce the overlapping of the ink dots and to allow the individual ink dots to be easily identified. At the time of the actual printing, ink dots of the size shown in FIG. 2A are formed as ink dots of each size.

In the figure, the ink dots arranged in the main scanning direction (Y direction) are dots formed by one nozzle in one inkjet head 102. Furthermore, in this case, the arrangement of ink dots arranged in the main scanning direction can also be considered as dots formed in one main scan by one nozzle. In each main scan, each nozzle of each inkjet head 102 forms a plurality of ink dots arranged in the main scanning direction by ejecting ink to a preset ejection position set in advance according to the image to be printed. In this case, the ink of any volume of S, M, or L is ejected to each ejection position to which the ink is to be ejected. Furthermore, in the figure, letters L1 to L5 indicate five lines lined in the sub scanning direction. In this case, a line is a line formed by a plurality of ink dots arranged in the main scanning direction. Moreover, as can be understood from the above description, in this case, each line corresponds to each of the five nozzles arranged continuously in the nozzle row direction parallel to the sub scanning direction (X direction).

Moreover, in FIG. 2C, an example of the arrangement of ink dots is shown for a case where the nozzle corresponding to the line denoted with the letter L3 is a non-ejection nozzle that does not eject ink. In this case, as shown in the figure, a state in which the dots forming the line denoted with the letter L3 are removed from the arrangement of ink dots shown in FIG. 2B is obtained. Furthermore, in this case, as one line disappears, streaky portions (white stripes) where the amount of ink runs short produce in the printing result, and the printing quality may lower.

Figure 3A:
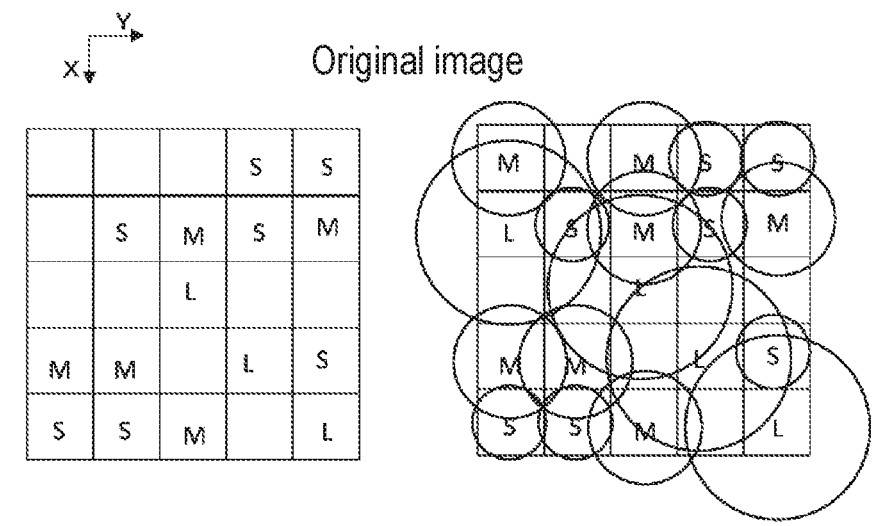
FIGS. 3A to 3C are views describing the recovery process performed in the present example in more detail.
Figure 3B:
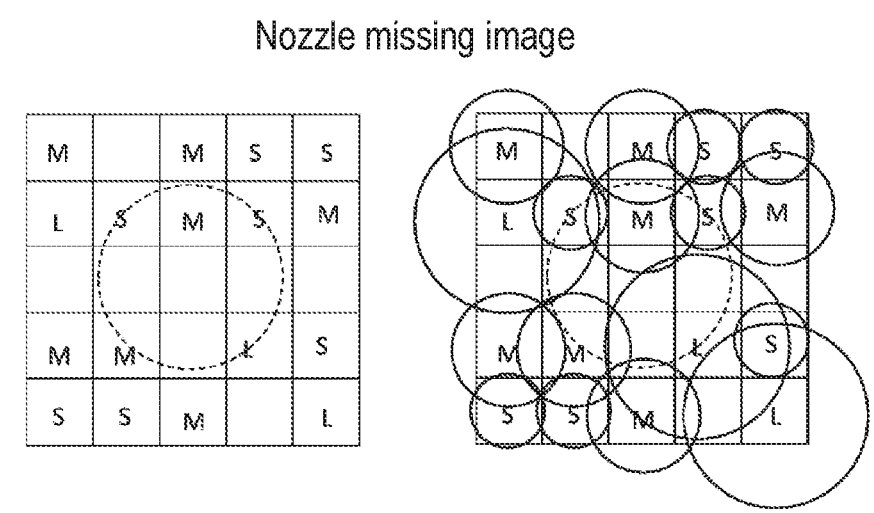
Figure 3C:
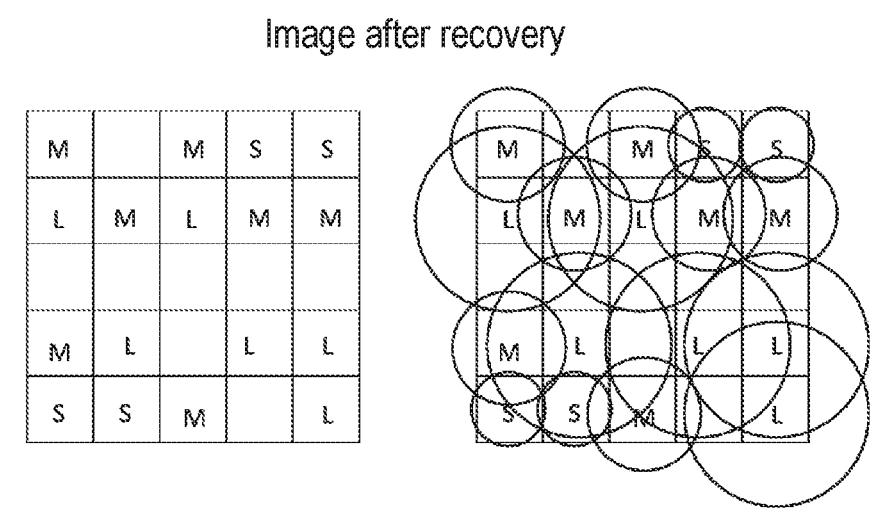

On the other hand, as described above, in the present example, the recovery process is performed to suppress the influence caused by the presence of the abnormal nozzle. FIGS. 3A to 3C are views describing the recovery process performed in the present example in more detail. FIG. 3A is a view showing an example of an original image which is an image to be printed when an abnormal nozzle is not present, and schematically shows an example of ink dots forming the original image. Furthermore, in FIG. 3A, the figure on the left side indicates the size of the ink dot formed at each position set according to the resolution by letters S, M, and L. In a figure on the right side, circles indicating the size of dots of each size are shown in an overlapping manner with respect to the same figure as the figure on the left side. The example of ink dots shown in FIG. 3A can be considered as corresponding to, for example, a part of the arrangement of the ink dots shown in FIG. 2B. Moreover, in FIG. 3A and in FIGS. 3B and 3C described below, an example of ink dots forming a part corresponding to five nozzles arranged continuously in the sub scanning direction is shown, similar to FIGS. 2B, 2C and the like.

FIG. 3B shows an example of a nozzle missing image which is an image printed when an abnormal nozzle is present. The nozzle missing image can be considered as, for example, an image obtained by printing the same image as the original image without causing the abnormal nozzle to eject ink. Furthermore, in FIG. 3B as well, the view on the left side shows the size of the ink dot formed at each position set according to the resolution with the letters S, M. and L. In a figure on the right side, circles indicating the size of dots of each size are shown in an overlapping manner with respect to the same figure as the figure on the left side. Moreover, in FIG. 3B, an example of how the dots are arranged in a case where the nozzle corresponding to the line located at the center in the sub scanning direction in the figure is a non-ejection nozzle. In this case, as indicated by a broken line circle in the figure, an L-size dot formed at the central square position in the original image shown in FIG. 3A is not formed. As a result, shortage in the amount of ink occurs at the position of the relevant line as compared to the original image.

On the other hand, in the present example, as also described above, the recovery process is performed by causing any other nozzle other than the abnormal nozzle to eject an amount of ink larger than that in the normal time. More specifically, in this case, the size of the ink dot formed at the ejection position in the vicinity of the missing pixel (nozzle missing pixel), which is the ejection position where the ink dot is not formed due to the presence of the abnormal nozzle, is made larger (increased) than that in the normal time to compensate for the shortage of ink caused by the influence of the ejection position to become the missing pixel, and the influence of the abnormal nozzle is reduced.

FIG. 3C shows an example of a recovery image (post-recovery image) which is an image printed by performing the recovery process. In FIG. 3C as well, the figure on the left side indicates the size of the ink dot formed at each position set according to the resolution with the letters S. M, and L. In a figure on the right side, circles indicating the size of dots of each size are shown in an overlapping manner with respect to the same figure as the figure on the left side. As shown in the figure, in this case, the size of the dots is increased relative to the original image for some ink dots forming the line other than the line corresponding to the abnormal nozzle. In this case, to increase the size of the dots means to change the stage corresponding to the volume of ink to be ejected to the ejection position by the nozzle to a larger stage. Furthermore, the operation of the control unit 30 (see FIGS. 1A and 1B) at the time of the recovery process can be considered as an operation or the like for causing the other nozzles to eject a larger amount of liquid than at the normal time, for example, by changing a stage corresponding to the volume of ink to be ejected by other nozzles other than the abnormal nozzle to the ejection position where the ejection amount of ink is to be large to a stage corresponding to a larger volume. Moreover, the operation of the control unit 30 when an abnormal nozzle is present can be considered as an operation or the like for causing the other nozzles to eject a larger amount of ink than at the normal time, for example, to at least a part of the ejection position where ink can be ejected by other nozzles in the vicinity of the abnormal nozzle at the time of the main scan.

As will be described in more detail below, in the present example, the ejection position for increasing the size of the dot is selected based on the influence degree matrix and the priority rank matrix stored in the storage 22 (see FIGS. 1A and 1B). With such a configuration, for example, the dot size can be changed not by simply adjusting the amount of ink but so that the ink more appropriately covers (fills) the position of the missing pixel. Therefore, according to the present example, the influence of the abnormal nozzle can be more appropriately reduced, for example, as compared with a case where the total amount of the ink is simply combined. For example, the recovery process can be performed more appropriately with higher accuracy.

Figure 4A:
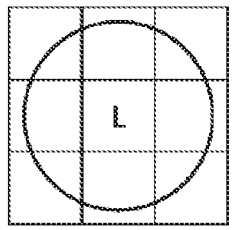
FIGS. 4A to 4C are views describing the recovery process in more detail.
Figure 4A:
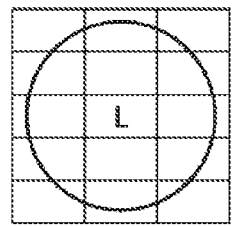
Figure 4B:
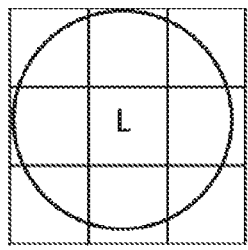
Figure 4B:
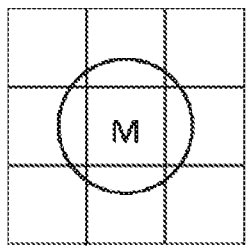
Figure 4B:
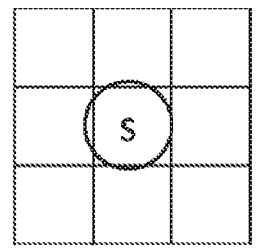
Figure 4B:
Figure 4B:
Figure 4B:
Figure 4C:
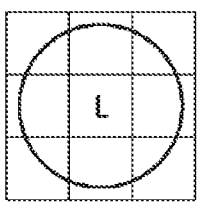
Figure 4C:

Now, the recovery process performed in the present example will be described in more detail. FIGS. 4A to 4C are views describing the recovery process in more detail. As described above, in the present example, the recovery process is performed by making the size of the ink dot formed at the ejection position in the vicinity of the missing pixel larger than that at the normal time. In this case, for example, as described below, the recovery range, which is a range used for recovery, is set with respect to the ejection position corresponding to the abnormal nozzle, and the dot size is adjusted within the recovery range. Thus, in the main scan, the control unit 30 does not cause the abnormal nozzle to eject ink and causes other nozzles to eject a larger amount of ink than at the normal time to a part of the ejection position where the ink can be ejected by the other nozzles. Furthermore, the recovery range is determined based on a range (range of pixels which can be covered by L dots) in which L size dots (hereinafter referred to as L dots) are spread. The recovery range can also be considered as, for example, a range in which the ejection amount of ink by other nozzles in the periphery of (in the vicinity of) the abnormal nozzle is adjusted.

Furthermore, in the recovery process, it is conceivable to use at least a nozzle adjacent to the abnormal nozzle as the other nozzle near the abnormal nozzle. In this case, it is preferable to use a plurality of nozzles including a nozzle adjacent to the abnormal nozzle as the other nozzles. More specifically, for example, it is preferable to use two or more nozzles on one side and two or more nozzles on the other side in the nozzle row direction with respect to the abnormal nozzle as the other nozzle. In addition, as for the other nozzle, for example, it is also conceivable to use a nozzle that can eject ink to an ejection position that affects the original ejection position of the abnormal nozzle. In this case, the recovery range is set in accordance with the range of other nozzles to be used.

FIG. 4A is a view showing an example of the recovery range, and shows an example of the recovery range for two cases where the relationship between the resolution of printing and the size of the L dot is different from each other. In FIG. 4A, a view on the left side shows an example of the recovery range in a case where the L dots are spread in the range of 3×3 pixels in which three ejection positions are arranged in each of the main scanning direction and the sub scanning direction. In this case, a range corresponding to 3×3 pixels in which the ejection position corresponding to the abnormal nozzle is the center is used as the recovery range. Furthermore, a view on the right side shows an example of the recovery range in a case where the L dots are spread in a range of 3×5 pixels in which three ejection positions are arranged in the main scanning direction and five ejection positions are arranged in the sub scanning direction. In this case, a range corresponding to 3×5 pixels in which the ejection position corresponding to the abnormal nozzle is the center is used as the recovery range. With such a configuration, for example, the recovery range can be appropriately determined in accordance with the resolution of printing. For example, the recovery range can be dynamically changed according to the resolution.

In the recovery process of the present example, a coverage is calculated with respect to a coverage calculation range set to include the ejection position corresponding to the abnormal nozzle, and the size of the ink dots in the recovery range is adjusted so that coverages match between before the nozzle missing and after the recovery process. In this case, the coverage is a numerical value indicating the extent to which the squares corresponding to the resolution are filled by the ink (amount of dots filled), and is calculated based on a dot model indicating the relationship between the ink dots of each size and the resolution. More specifically, in the present example, the coverage corresponding to ink dots of each size is as shown in FIG. 4B. FIG. 4B shows an example of a coverage corresponding to ink dots of each size. Furthermore, in this case, the coverage of the coverage calculation range can be considered, for example, as a numerical value or the like indicating the extent to which the squares included in the coverage calculation range are filled with ink dots formed within the recovery range. Regarding the operation of the recovery process, the coverage before the nozzle missing is the coverage calculated based on the ink dots forming the original image. The coverage after the recovery process is a coverage calculated with the size of at least some ink dots within the recovery range adjusted. In addition, when the coverages match, the coverages may match within a preset tolerable error range. More specifically, in the present example, when the coverages match, the difference in the coverage may be minimized.

Furthermore, in the present example, the coverage calculation range is an example of a predetermined range including the original ejection position of the abnormal nozzle. The operation of matching the coverages in the coverage calculation range is an example of an operation of making the adjustment so that the total ejection amount after the adjustment approaches the total ejection amount at the normal time with respect to the total ink ejection amounts within such a predetermined range. Furthermore, the coverage calculation range can also be considered as, for example, a specified range or the like when calculating the coverage of an image at the time of the recovery process.

As described above, in the present example, the recovery process is performed using the influence degree matrix and the priority rank matrix. In this case, the influence degree matrix and the priority rank matrix are created based on the dot model of L dots (L dot model). FIG. 4C is a view showing an example of the influence degree matrix and the priority rank matrix, and shows an example of the influence degree matrix and the priority rank matrix when a range corresponding to 3×3 pixels is used as a recovery range.

Here, the influence degree matrix is, for example, matrix-like data obtained by ranking the influence of the arrangement of L dots. Furthermore, in the present example, the influence degree matrix is an example of influence degree information. In this case, the influence degree information is, for example, information indicating the influence degree that occurs among a plurality of ejection positions where the ink is ejected in one main scan. More specifically, in the present example, the influence degree matrix is a matrix configured by elements corresponding to a plurality of ejection positions forming the recovery range. Furthermore, in this case, a value indicating the magnitude of the influence on each ejection position when the L dot is formed at the central ejection position in the recovery range is set to the element corresponding to each ejection position. In this case, the central ejection position in the recovery range is the position marked with x in the figure. Furthermore, the magnitude of the influence on each ejection position is, for example, the size of the range in which each ejection position is covered by the L dot formed at the center position of the recovery range.

More specifically, values indicating the ranks obtained by ranking the influence are set as values to be set to the elements of the influence degree matrix such that smaller values indicate larger influence. In this case, the influence degree matrix can be considered as, for example, information associating any one of the influence degrees among a plurality of types of influence degrees, in which the magnitude of influence is different from each other, to each of a plurality of ejection positions at the periphery of one ejection position for the magnitude of influence at one ejection position. Furthermore, in the present example, the central ejection position in the recovery range is the original ejection position of the abnormal nozzle. In this case, the original ejection position of the abnormal nozzle is the ejection position where the liquid should have been ejected if the abnormal nozzle was a normal nozzle. Then, in this case, the influence degree matrix can be considered as, for example, a matrix and the like in which a numerical value indicating the influence degree on the original ejection position of the abnormal nozzle is defined with respect to a plurality of ejection positions centered on the original ejection position of the abnormal nozzle. Furthermore, for example, by forming ink dots at each of a plurality of ejection positions in the periphery of one ejection position, the influence degree matrix can be considered as information and the like indicating the magnitude of influence of the one ejection position in association with each of a plurality of ejection positions in the periphery. The original ejection position of the abnormal nozzle can be defined, for example, as an abnormal nozzle corresponding position which is an ejection position corresponding to the abnormal nozzle.

As described above, the influence degree matrix is used in the recovery process. In the recovery process, the coverage of the coverage calculation range is changed by adjusting the size of the ink dot formed by the nozzles other than the abnormal nozzle. Therefore, as shown in the figure, for example, it is conceivable to use a matrix in which values are set only to the positions corresponding to the nozzles other than the abnormal nozzle as the influence degree matrix. Through the use of such an influence degree matrix, for example, an ejection position to which a larger amount of ink is to be ejected by other nozzles other than the abnormal nozzle can be appropriately selected in consideration of the influence degree on the original ejection position of the abnormal nozzle.

The priority rank matrix is a matrix that specifies the order of performing the adjustment for increasing the size of the dot with respect to a plurality of ejection positions included in the recovery range. In the present example, the priority rank matrix is an example of priority information. The priority information is, for example, information indicating the priority of selection with respect to a plurality of ejection positions associated with the influence degree. In addition, the priority rank matrix can be considered as, for example, matrix-like data and the like indicating the priority rank as the priority. Furthermore, in the present example, the priority rank matrix is a matrix in which numerical values indicating the priority ranks are defined with respect to a plurality of ejection positions centered on the original ejection position of the abnormal nozzle. In this case, a numerical value indicating the order of selection is used as a numerical value indicating the priority rank. In the figure, the original ejection position of the abnormal nozzle is an ejection position marked with x in the figure.

More specifically, in the influence degree matrix of the present example, as shown in the figure, for example, the same influence degree may be associated with a plurality of ejection positions. In such a case, the priority rank matrix is further used so that the ejection position to increase the amount of ink can be more appropriately selected, for example, even when the same influence degree is associated with respect to a plurality of ejection positions, and the like. As shown in the figure, in the present example, a matrix of the same size as the influence degree matrix is used as the priority rank matrix. According to the present example, for example, the ejection position to increase the amount of ink and increase the size of the dot can be more appropriately selected.

Figure 5A:
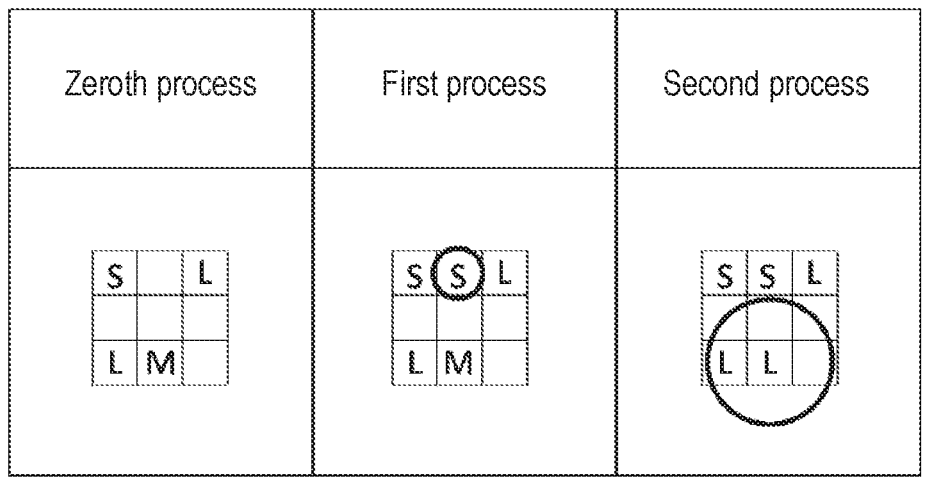
FIGS. 5A and 5B are views describing the operation of increasing the size of the dot and the like in more detail.
Figure 5A:
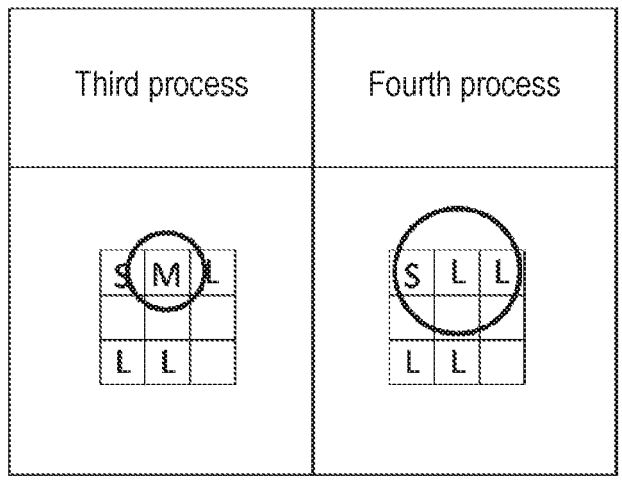
Figure 5B:
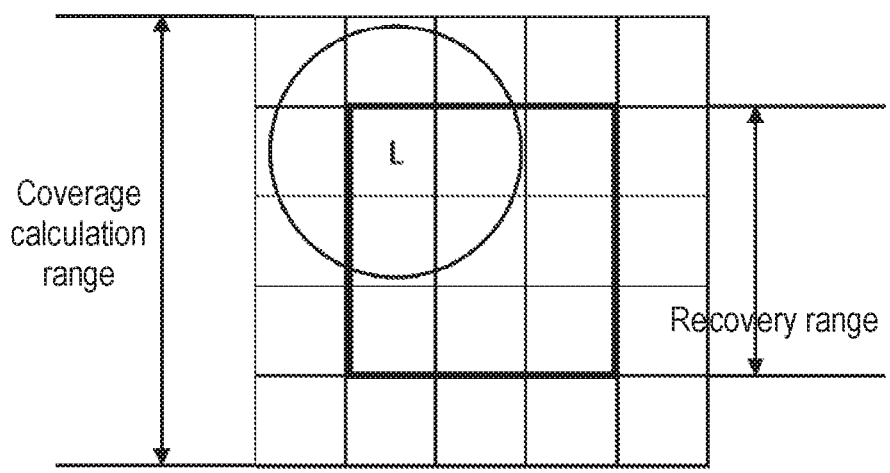

FIGS. 5A and 5B are views describing the operation of increasing the size of the dot and the like in more detail. FIG. 5A is a view showing an example of a manner of increasing the size of the dot, and shows an example of an operation of increasing the size of the dot to be formed at the ejection position included in the recovery range for a case where the influence degree matrix and the priority rank matrix shown in FIG. 4C are used. Furthermore, in the figure, the 0th process shows a state before the process for increasing the dot size. Further, each of the first process to the fourth process indicates the process for increasing the size of the dot at one ejection position by one stage.

As described above, in the present example, the ejection position within the recovery range is selected based on the influence degree matrix and the priority rank matrix, and the size of the dot formed at the ejection position is increased to perform the recovery process. Thus, for example, the ejection position having a high influence degree set in the influence degree matrix is selected with higher priority, and the dot size is increased. Furthermore, in this case, the recovery range is scanned in the order according to the values specified in the priority rank matrix, and the process for increasing the size of the dot is repeated targeting on the ejection positions set with the same influence degree until the dots formed at all the ejection positions to which the same influence degree is set become L dots. Then, when it is necessary to further increase the dot size even with respect to other ejection positions at the time point the dots formed at all the ejection positions to which the same influence degree is set become L dots, the process for increasing the size of the dot is performed similar to the above targeting on the ejection positions to which the second highest influence degree is set. Thus, for example, the operation of changing the size of the dot with respect to the ejection position of the next influence degree is performed after the ejection position having the same influence degree is filled with L dots.

Here, the information indicated by the influence degree matrix used in the present example can be considered as, for example, including ejection positions associated with a plurality of types of influence degrees different from each other as a plurality of ejection positions associated with any one of the influence degrees. In this case, such an ejection position can be considered to include, for example, a plurality of ejection positions associated with a first influence degree, which is the influence degree indicating the largest influence among a plurality of types of influence degree, and an ejection position associated with a second influence degree indicating an influence smaller than the first influence degree. Furthermore, in this case, the operation of the control unit 30 (see FIGS. 1A and 1B) when an abnormal nozzle is present can be considered as, for example, an operation of preferentially selecting the ejection position associated with the first influence degree among a plurality of ejection positions at the periphery of the ejection position where ink is ejected by the abnormal nozzle based on the influence degree matrix. With this configuration, for example, the ejection position associated with the influence degree indicating a larger influence can be preferentially selected among the plurality of ejection positions at the periphery of the original ejection position of the abnormal nozzle. Furthermore, in this case, the control unit 30 changes, for example, the stage indicating the volume of the ink ejected to at least a part of the ejection position associated with the first influence degree to a larger stage than at the normal time. Furthermore, in this case, for the ejection position associated with the second influence degree, for example, it can be considered that the volume of ink is greatly changed only after the volume of ink ejected to the ejection position associated with the first influence degree is changed to the maximum stage (stage of L dot). That is, in this case, for example, the control unit 30 changes the stage indicating the volume of ink ejected to at least a part of the ejection position associated with the second influence degree to a larger stage than at the normal time only when the volume of ink ejected to all the ejection positions associated with the first influence degree is changed to the maximum stage, and the volume of ink ejected to the other ejection positions is further increased. According to such a configuration, for example, the amount of ink can be increased preferentially and more appropriately with respect to the ejection position having a large influence degree.

Furthermore, as described above, in the recovery process performed in the present example, the coverage is calculated with respect to the coverage calculation range, and the size of the ink dot in the recovery range is adjusted based on the calculation result. In this case, the coverage calculation range is preferably larger than the recovery range, for example, as shown in FIG. 5B.

FIG. 5B is a view showing the relationship between the recovery range and the coverage calculation range in the present example, and shows an example of a relationship between the recovery range and the coverage calculation range when the recovery range is a 3×3 pixel range and the coverage calculation range is a 5×5 pixel range. As described above, the coverage calculation range is set to include the ejection position corresponding to the abnormal nozzle. More specifically, in the present example, when an L dot is placed on a square on the outermost side of the recovery range (square corresponding to the resolution of printing), a range affected by such L dot is set as the coverage calculation range. The range affected by the L dot when the L dot is placed on the square on the outermost side of the recovery range is, for example, the square to which at least a part of the L dot is placed when the L dot is formed at the ejection position in the corner of the recovery range. According to such a configuration, the coverage calculation range is a range larger than the recovery range and including the recovery range. Therefore, according to the present example, even when the influence of ink dots formed in the recovery range extends to the outside of the recovery range, the influence on the periphery can be appropriately taken into consideration.

Here, when the coverage calculation range and the recovery range are the same, it can be considered that even if the coverage within the recovery range is properly adjusted, the amount of ink becomes excessive at the periphery. Moreover, as a result, the total amount of ink may be in an excessive state for the entire image, and the print quality may degrade by performing the recovery process. On the other hand, according to the present example, it is possible to appropriately prevent the total amount of ink after the recovery process from increasing. The recovery process of high accuracy thus can be more appropriately performed.

In addition, for the recovery process in the case shown in the figure, for example, it may be considered that the recovery process is performed using a nozzle other than the abnormal nozzle among the three nozzles arranged continuously including the abnormal nozzle in the nozzle row. In this case, the recovery range can be considered, for example, as a range in which ink is ejected by such other nozzle at the periphery of the original ejection position of the abnormal nozzle. The recovery range may be considered as, for example, a range corresponding to three nozzles arranged continuously including the abnormal nozzle. In this case, the coverage calculation range can be considered, for example, as a range corresponding to five nozzles arranged continuously including the abnormal nozzle in the nozzle row.

In addition, when such characteristics are considered in a more generalized manner, in the recovery process, it is conceivable to use a nozzle other than the abnormal nozzle among the N (N is an integer greater than or equal to two) nozzles arranged continuously including the abnormal nozzle in the nozzle row as other nozzles in the vicinity of the abnormal nozzle. Then, in this case, the recovery range can be considered as, for example, a range where ink is ejected by other such nozzles at the periphery of the original ejection position of the abnormal nozzle, a range corresponding to N nozzles arranged continuously including the abnormal nozzle, and the like. Furthermore, the coverage calculation range can be considered as, for example, a range corresponding to M (M is an integer greater than or equal to two) nozzles arranged continuously including an abnormal nozzle in a nozzle row. In this case, for example, if the total amount of ink ejected in a predetermined range in the main scanning direction by such M nozzles is defined as an in-range total ejection amount, the coverage calculation range can be considered as a range in which the in-range total ejection amount is calculated. In this case, for example, the coverage calculation range can be made larger than the recovery range by setting M to an integer greater than N. Moreover, in this case, for example, if the in-range total ejection amount at the normal time is defined as a normal time ejection amount, and the in-range total ejection amount in a state where the amount of ink to be ejected by other nozzles is adjusted when an abnormal nozzle is present is defined as a post-adjustment ejection amount, the operation of the recovery process performed in the present example can be considered as, for example, an operation of adjusting the amount of ink to be ejected by other nozzles to bring the post-adjustment ejection amount closer to the normal time ejection amount.

Now, a flow of the entire recovery process performed in the present example will be described in more detail. In the present example, the printing apparatus 10 uses a raster image generated by RIP process as image data indicating an image to be printed. In this case, this raster image can be considered, for example, as data indicating the ink ejection position. Furthermore, the raster image can also be considered, for example, as an image (binarized image) or the like that has been subjected to binarization process in accordance with the configuration of the printing apparatus 10, printing conditions, and the like. Furthermore, in the present example, the control unit 30 causes the nozzles of each of the inkjet heads 102 (see FIGS. 1A and 1B) in the head unit 12 to eject ink based on such a raster image.

In the present example, the raster image is also used as input data (INPUT) at the time of the recovery process. Then, when an abnormal nozzle is present, the control unit 30 performs the recovery process, for example, by correcting the raster image based on the influence degree matrix and the priority rank matrix. Then, by causing each of the nozzles to eject ink based on the recovery image (recovery processed image) which is a raster image after correction, the other nozzles are caused to eject a larger amount of ink than at the normal time with respect to a part of the ejection positions to where ink can be ejected by other nozzles at the periphery of the abnormal nozzle in the main scan.

Figure 6:
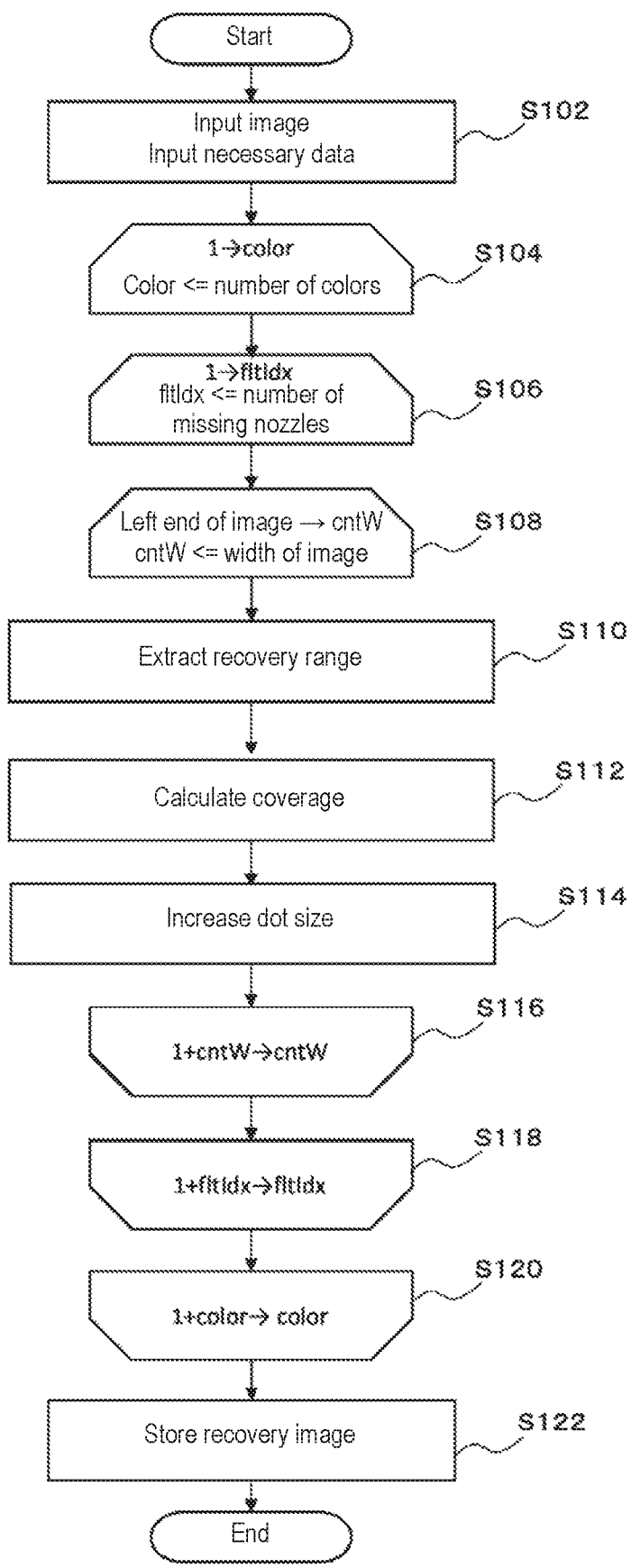
FIG. 6 is a flowchart showing an example of a recovery process.

FIG. 6 is a flowchart showing an example of the recovery process. In the present example, at the time of execution of the recovery process, first, necessary input data is input (S102). In this case, as described above, a raster image is input as input data. In addition to the raster image, for example, various data necessary for the recovery process are input. In the present example, for such data, for example, image resolution, ink dot size (dot diameter), position of a missing pixel which is an ejection position corresponding to an abnormal nozzle, and number of channels which is a number of colors forming an image are input.

Then, as shown by steps S104 and S120 in the figure, the operations of steps S106 to S118 are performed for each color channel of the image by sequentially changing the value of the variable Color specifying the color channel. In addition, as shown by steps S106 and S118, the operations of steps S108 to S118 are performed for each position of the missing pixel in the height direction by sequentially changing the value of the variable fltIdx specifying the position of the missing pixel in the height direction of the image. The height direction of the image is a direction parallel to the sub scanning direction in the image. In addition, as shown by steps S108 and S116, the operations of steps S110 to S114 are performed for each position of the missing pixel in the width direction by sequentially changing the value of the variable cntW specifying the position of the missing pixel in the width direction of the image. The width direction of the image is a direction parallel to the main scanning direction in the image. Furthermore, the operations in steps S110 to S114 are operations for performing the recovery process with respect to one ejection position (original ejection position of the abnormal nozzle) corresponding to the abnormal nozzle. The operations in steps S110 to S114 are repeatedly executed by the number of colors and the number of missing pixels by using the variables as described above.

More specifically, in the recovery process for one ejection position corresponding to an abnormal nozzle, first, the recovery range corresponding to the ejection position is extracted (S110), and the coverage is calculated with respect to the coverage calculation range corresponding to the recovery range (S112). In this case, extracting the recovery range is, for example, extracting an image of a region corresponding to the coverage calculation range corresponding to the recovery range from the image input in step S102. In this case, in step S112, the coverage is calculated at least for the image extracted in step S110. Then, based on the calculation result of the coverage in step S112, the influence degree matrix, and the priority rank matrix, the size of the dot corresponding to any ejection position within the recovery range is increased as necessary (S114). The operations performed in steps S110 to S114 will be described in more detail later. Furthermore, after the above process is performed for all colors and missing pixels, a recovery image which is a raster image (raster image after correction) reflecting the result of changing the dot size is saved (S122), and the operation is terminated. According to the present example, the recovery process can be appropriately performed.

Subsequently, each configuration and operation described above will be described in more detail. First, a manner of generating the influence degree matrix and the priority rank matrix will be described in more detail. As described above, in the present example, the recovery process is performed using the influence degree matrix and the priority rank matrix. In this case, the influence degree matrix and the priority rank matrix may be created in advance based on, for example, a dot model indicating the relationship between the resolution of printing and the size of the ink dot.

Figure 7A:
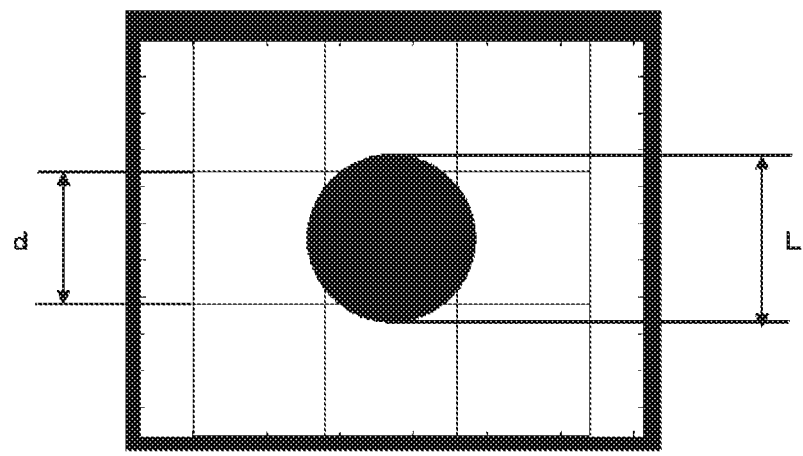
FIGS. 7A to 7C are views describing the relationship between the dot model and the influence degree matrix.
Figure 7B:
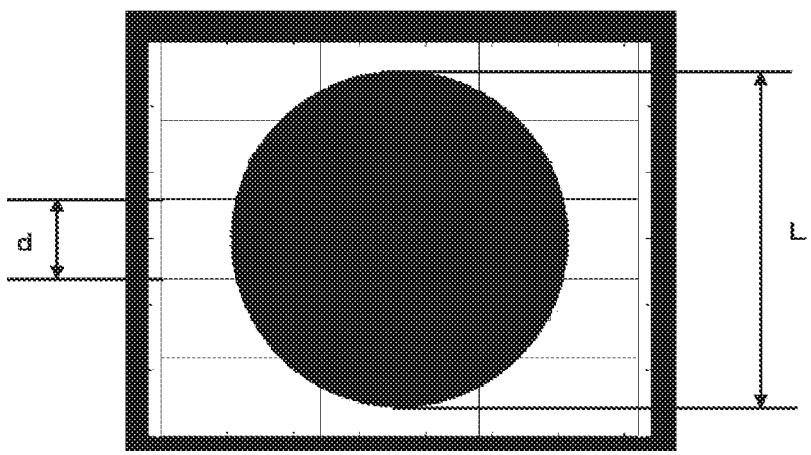
Figure 7C:
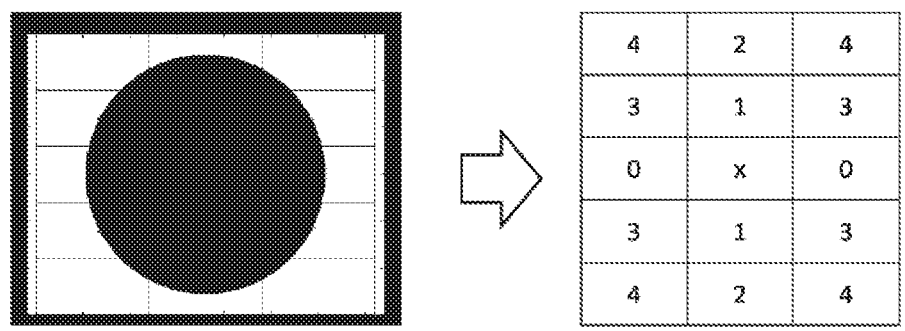

FIGS. 7A to 7C are views describing the relationship between the dot model and the influence degree matrix. FIGS. 7A and 7B show examples of the relationship between the resolution of printing and the size of the ink dot. Furthermore, FIG. 7A shows an example of an L dot model which is a relationship between the resolution of printing and the size of the L dot for a case where the resolution of printing of 360×360 dpi. FIG. 7B shows an example of the L dot model for a case where the resolution of printing is 600×1200 dpi. In the figure, d indicates an inter-dot distance corresponding to the resolution in the sub scanning direction. The inter-dot distance corresponding to the resolution is a distance between the ejection positions set according to the resolution. L is the diameter of the L dot.

As described above, in the present example, the recovery process is performed by changing the size of the dots within the recovery range. Therefore, as the recovery range, it is conceivable to set a range that affects the original ejection position of the abnormal nozzle when L dots are formed based on the L dot model. Furthermore, it is conceivable to generate the influence degree matrix so as to correspond to such a recovery range.

FIG. 7C is a diagram showing an example of the relationship between the L dot model and the influence degree matrix, and shows an example of the influence degree matrix generated based on the L dot model shown in FIG. 7B. As described above, the influence degree matrix is matrix-like data obtained by ranking the influence of the arrangement of L dots. Further, the influence degree matrix can be considered as, for example, a matrix formed by ranking the influence degree of the L dot on the peripheral pixels.

As can be understood from the L dot model shown in the figure, the range affected by the L dot in which the missing pixel corresponding to the original ejection position of the abnormal nozzle is formed at the periphery can be obtained from the range in which the L dot spreads in the L dot model. More specifically, in the present example, the magnitude of the influence on the missing pixel when the L dot is formed in the vicinity of the missing pixel is ranked by a predetermined number of stages based on the coverage of the L dot to form a matrix, thus generating the influence degree matrix. Furthermore, more specifically, in the case shown in FIG. 7C, a matrix in which numbers 1, 2, . . . are assigned in order from the ejection position having a high influence degree on the missing pixel is generated based on the L dot model. In this case, the same numbers are assigned to the positions having the same influence degree. Moreover, in the present example, having the same influence degree means being in the same rank in the ranking. Furthermore, in this case, 0 is assigned to the ejection position not used for the recovery process. Moreover, in FIG. 7C, an example of the influence degree matrix generated in such a manner is shown in the right side part of the figure.

Note that, depending on the configuration of the printing apparatus 10, for example, there may be cases where the diameter of the L dot is less than one printing resolution. In such a case, it is conceivable to set a range of 1×3 pixels including the two ejection positions adjacent to the missing pixel in the sub scanning direction and the ejection position corresponding to the missing pixel as the recovery range.

Furthermore, in the influence degree matrix, for example, as in the example shown in FIG. 7C, it is conceivable that the same influence degree is associated with a plurality of ejection positions. In this case, as described above, the priority rank matrix is further used to specify the order of selecting the ejection position for increasing the dot size. In the present example, a priority rank matrix corresponding to the influence degree matrix is generated by generating the priority rank matrix based on the influence degree matrix.

FIGS. 8A and 8B are views describing the priority rank matrix in more detail. FIG. 8A is a view showing an example of the priority rank matrix, and shows an example of the priority rank matrix showing the priority ranks for the range of 3×5 pixels. Furthermore, this priority rank matrix is an example of the priority rank matrix corresponding to the influence degree matrix shown in FIG. 7C.

FIG. 8B is a view showing an example of a manner of generating a priority rank matrix, and shows an example of a manner of generating a priority rank matrix corresponding to the influence degree matrix shown in FIG. 7C. More specifically, in this case, first, priority ranks are sequentially assigned to the ejection positions to which the influence degree 1 (number 1), which is the highest influence degree, is specified in the influence degree matrix. More specifically, in this case, priority ranks 1 and 2 are assigned to two ejection positions on both sides of the missing pixel in the vertical direction in the drawing. Thereafter, for example, as shown in the figure, the next priority rank is applied to the ejection position farthest in the priority rank matrix from the ejection position to which the priority rank (number) is applied immediately before in the order of influence degree. In addition, the priority rank is sequentially applied to each position where the influence degree is set in the influence degree matrix. Moreover, FIG. 8B shows up to a state in which the fifth priority rank is assigned. The priority rank matrix shown in FIG. 8A is completed by repeating the above procedure even after the illustrated state.

As described above, according to the present example, the influence degree matrix and the priority rank matrix can be appropriately generated. Furthermore, as described above, in the present example, the influence degree matrix and the priority rank matrix may be generated in advance, for example, before the recovery process is performed. However, depending on the configuration of the printing apparatus 10, for example, it is conceivable to generate the influence degree matrix and the priority rank matrix in an operation of performing the recovery process. In this case, for example, in the operation shown by the flowchart in FIG. 6, it is conceivable to generate the influence degree matrix and the priority rank matrix, for example, between step S104 and step S106.

Furthermore, as described above, in the present example, the operation of the recovery process is repeated for each color (color channel) used for printing. In this case, for example, another matrix may be generated for each color for the influence degree matrix and the priority rank matrix. In this case, it is conceivable to generate the influence degree matrix and the priority rank matrix for each color based on a dot model for each color of ink. With this configuration, for example, the recovery process can be appropriately performed with higher accuracy. In addition, for example, when the dot model of each color can be regarded as the same, the same influence degree matrix and priority rank matrix may be used for all the colors according to the accuracy required for printing and the like. With this configuration, for example, the recovery process can be performed more easily.

Next, an operation of adjusting the coverage by increasing the size of the dot within the recovery range will be described in more detail. As described above with reference to FIG. 6 and the like, in the recovery process performed in the present example, for example, as described above as the operations of steps S110 and S112 shown in FIG. 6, the recovery range is extracted from the image (input image) input as the target of the recovery process, and the coverage is calculated for the coverage calculation range corresponding to the relevant recovery range.

Furthermore, in this case, an image obtained by extracting the recovery range from the input image can be considered as an original image. The original image can also be considered as, for example, a non-nozzle missing image in which nozzle missing has not occurred. Then, in the present example, a nozzle missing image, a recovery image, and a maximum recovery image corresponding to the recovery range are generated based on the extracted original image. As described above, the nozzle missing image is an image obtained by printing the same image as the original image without causing the abnormal nozzle to eject ink. Furthermore, in this case, the nozzle missing image corresponding to the recovery range can also be considered as, for example, an image or the like generated by blanking a part corresponding to the abnormal nozzle at the center of the original image.

Moreover, the recovery image is an image generated by the recovery process, as described above. In this case, the recovery image corresponding to the recovery range can be considered as an image or the like generated by the recovery process with respect to the recovery range. More specifically, in the recovery process of the present example, an image obtained by copying the nozzle missing image is first generated as a recovery image. Then, an overwrite process is performed on this image in the subsequent process to generate a final recovery image.

The maximum recovery image is an image in a case where L dots are formed at all ejection positions for which the dot size is to be adjusted within the recovery range. The maximum recovery image can also be considered, for example, as an image or the like in which the entire range reaching the nozzle missing position is recovered by the L dots. Furthermore, in the present example, the coverage is further calculated based on the size of the ink dot formed at each ejection position in the coverage calculation range with respect to the original image, the nozzle missing image, and the maximum recovery image. More specifically, for example, when the ink dots of three sizes of S, M, L as shown in FIG. 4B are used, and a range of 5×5 pixels as shown in FIG. 5B is used as the coverage calculation range, the coverage of ink dots of each size formed at each ejection position is added in the row direction and the column direction and summed within the coverage calculation range to calculate the coverage for the coverage calculation range.

Figure 9:
FIG. 9 is a view showing an example of a calculation result of coverage.
Figure 9:

FIG. 9 is a view showing an example of the calculation result of coverage, and shows an example of the calculation result of coverage for the original image and the nozzle missing image. In the illustrated case, the coverage of the original image shown as the case of no-nozzle missing is 30. Furthermore, the coverage of the nozzle missing image shown as the case of nozzle missing is 27.8. In this case, the coverage of the original image can be considered as the target coverage (target coverage) in the recovery process. Furthermore, in this case, as shown in the figure, when the coverage of the nozzle missing image is smaller than the target coverage, for example, as described in more detail later with reference to FIG. 10 and the like, a process for increasing the size of the dot corresponding to any ejection position within the recovery range is performed. As opposed to the illustrated case, for example, when the coverage of the nozzle missing image is equal to the target coverage, determination is made that the recovery process has ended, and the process proceeds to the recovery process corresponding to the next missing pixel.

Figure 10:
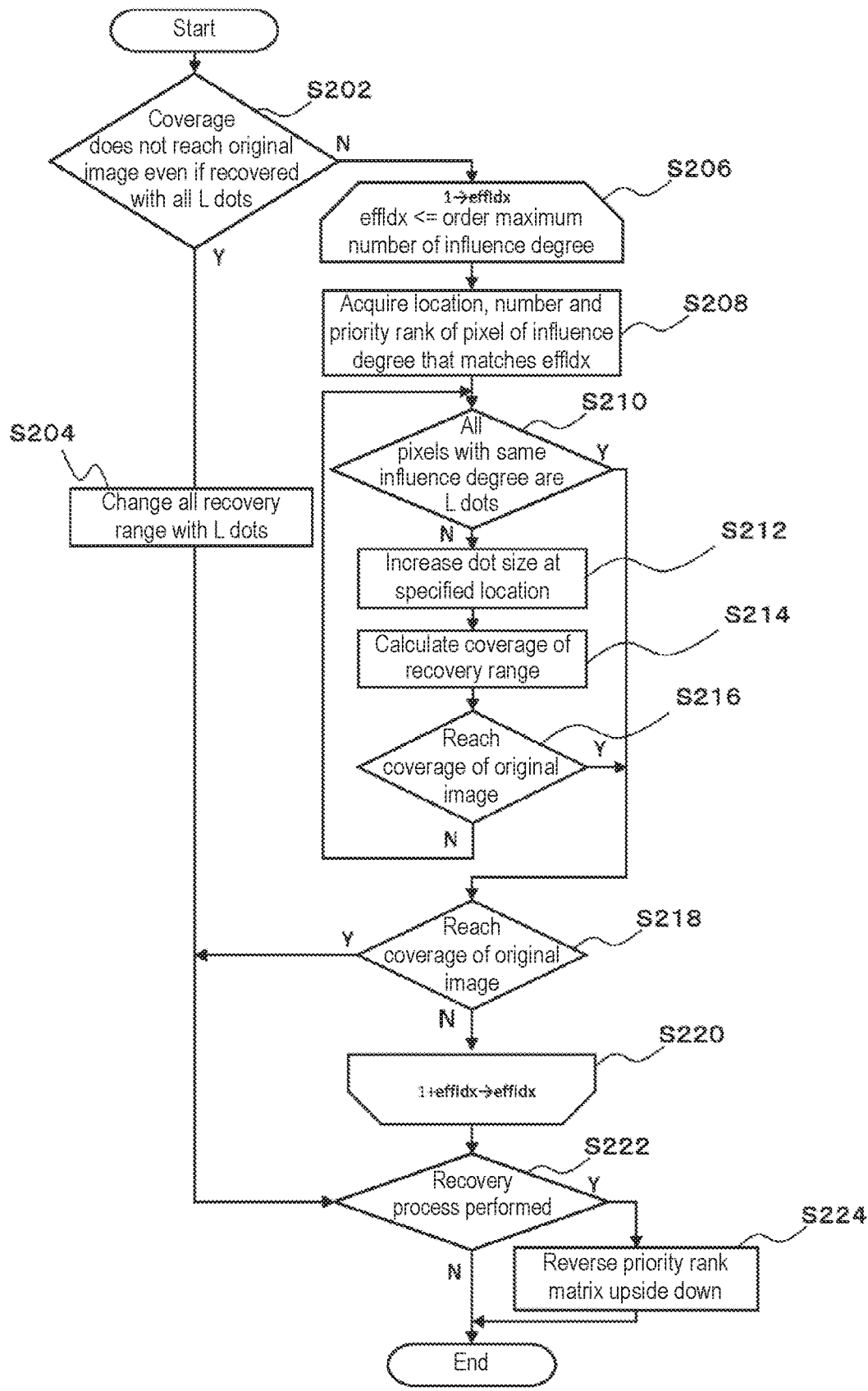
FIG. 10 is a flowchart showing an example of a process for increasing the dot size with respect to the ejection position within the recovery range.

FIG. 10 is a flowchart showing an example of a process for increasing the dot size with respect to the ejection position within the recovery range. Furthermore, in the present example, the operation illustrated in FIG. 10 is an example of a specific operation performed in step S14 of FIG. 6. In the case shown in FIG. 10, for example, a process for increasing the dot size is performed according to the order determined based on the influence degree matrix and the priority rank matrix using the influence degree matrix and the priority rank matrix shown in FIG. 4C.

More specifically, in the operation shown in FIG. 10, first, the coverage of the original image and the coverage of the maximum recovery image corresponding to the recovery range are compared to determine whether the coverage reaches the coverage (target coverage) of the original image when the ink dots formed at all the ejection positions within the recovery range are changed to L dots (S202). In this case, all ejection positions within the recovery range are ejection positions where ink is ejected by nozzles other than the abnormal nozzles within the recovery range. When the coverage of the original image is not reached even if the ink dots formed at all the ejection positions are changed to L dots (S202: Y), the ink dots formed at all the ejection positions within the recovery range are changed to L dots (S204), and the process proceeds to step S222. The operation performed in step S222 will be described later.

When the coverage of the original image is reached when the ink dots formed at all the ejection positions are changed to L dots (S202: N), the process proceeds to the operations of step S206 and subsequent steps, and the dot size is increased in order from the ejection position having a high influence degree with respect to the missing pixel until the coverage of the recovery image reaches the coverage of the original image. More specifically, in this case, as shown by steps S206 and S220, the operations of steps S208 to S218 are repeated as many times as necessary while changing the value of the variable effidx indicating the influence degree. In this case, the operations of steps S208 to S218 are repeated while the effidx is less than or equal to the order maximum number of influence degree with an initial value of effidx as one, as shown as the operation of step S206. Furthermore, as shown as the operation of step S220, the value of effidx is increased by one each time the operations of steps S208 to S218 are performed once. Such repetitive operations can be appropriately executed, for example, by using a for loop in a program.

Moreover, in the operation corresponding to one influence degree specified by effidx, first, the location (ejection position) of the pixel of the influence degree that matches the effidx and the priority rank are acquired based on the influence degree matrix and the priority rank matrix (S208). Then, until all the dots formed at the positions of the pixels with the same influence degree that matches effidx are changed to L dots (S210: N), the size of the dots formed at locations (ejection positions) specified according to the priority rank is increased by one stage (S212), and the state after the change is reflected on the recovery image. Then, the coverage of the recovery image is calculated (S214), and whether the calculation result has reached the coverage of the original image is determined (S216). When the calculation result has not reached the coverage of the original image (S216: N), the process returns to step S210, and the subsequent operation is repeated for the next location specified according to the priority rank.

When determined in step S210 that all dots formed at the positions of pixels with the same influence degree are L dots (S210: Y), the process on such influence degree is terminated, and the process proceeds to step S218. The process also proceeds to step S218 when determined in step S216 that the coverage of the recovery image has reached the coverage of the original image (S216: Y).

According to this configuration, for example, even when there are a plurality of ejection positions having the same influence degree, the size of the ink dot formed at each ejection position can be appropriately adjusted. Furthermore, in this case, the coverage is calculated in step S214 each time the size of the dot is increased and then compared with the target coverage, so that the coverage can be appropriately adjusted with high accuracy. In this case, for example, the size of the dot at the ejection position having a lower influence degree is not changed until all the dots formed at the ejection positions having the same influence degree are changed to the L dots. The repetitive operations performed in steps S210 to S216 can be appropriately executed, for example, by using a while loop in a program.

Furthermore, in the present example, in step S218 as well, whether the coverage of the recovery image has reached the coverage of the original image is determined. In addition, whether the recovery process is completed is determined at the end of the process performed on one influence degree. When determined that the coverage of the recovery image has not reached the coverage of the original image (S218: N), the process proceeds to step S220, and the value of effidx is increased by one. Then, when the value of effidx is less than or equal to the order maximum number of the influence degrees (S206), the operations after step S208 are repeated. When the value of effidx exceeds the order maximum number of the influence degrees, the process skips the repetitive process and proceeds to step S222. Furthermore, when determined in step S218 that the coverage of the recovery image has reached the coverage of the original image (S218: Y), the process also proceeds to step S222.

In step S222, whether the recovery process has been performed is determined. In this case, performing the recovery process means, for example, performing a process for increasing the size of the dots formed at any ejection position using the influence degree matrix and the priority rank matrix. When determined that the recovery process has been performed (S222: Y), the priority rank matrix is reversed upside down (S224), and the operation is ended. When determined in step S222 that the recovery process has not been performed (S222: Y), the operation is ended as it is. With such configuration, for example, the process for increasing the dot size with respect to the ejection positions within the recovery range can be appropriately performed.

Here, as described above, in the present example, when the coverage of the recovery image has reached the target coverage (coverage of the original image), the process for increasing the dot size is ended. In this case, of the recovery images immediately before and after exceeding the target coverage, it is preferable to save the one closer to the target coverage as the result of the recovery process. With this configuration, for example, the recovery process can be more appropriately performed.

Furthermore, in the operation described above, as described in the operation of step S224, the priority rank matrix is reversed upside down each time the recovery process is performed on one missing pixel. With this configuration, for example, it is possible to appropriately prevent the manner of selecting the ejection position for increasing the dot size from being biased. More specifically, as described above, in the present example, when an abnormal nozzle is present, the control unit 30 (see FIG. 1) in the printing apparatus 10, for example, performs the recovery process on each (each of a plurality of abnormal nozzle corresponding positions) of the original ejection positions of the abnormal nozzle. Then, in this case, for example, if the manner of selecting the ejection position performed based on the priority rank matrix is uniform, the influence of the manner of selecting the ejection position may arise in the state after the ejection of the ink (e.g., printing result etc.). On the other hand, if the operation of reversing the priority rank matrix upside down as described above is performed, the occurrence of such a problem can be appropriately prevented. Furthermore, for example, the recovery process of high accuracy can be more appropriately performed.

Moreover, the priority rank matrix may be reversed, for example, right and left rather than upside down. Furthermore, the manner of selecting the ejection position performed based on the priority rank matrix may be performed through a method other than the reversal of the matrix. The timing of changing the manner of selecting the ejection position is also not limited to every time the recovery process is performed on one missing pixel, and for example, may be performed every time the recovery process is performed on a plurality of missing pixels. In this case, the timing of changing the manner of selecting the ejection position can be considered as, for example, every time the recovery process corresponding to a preset number of abnormal nozzle corresponding positions is performed (every time the recovery process of a preset number of times is performed), and the like.

Figure 11:
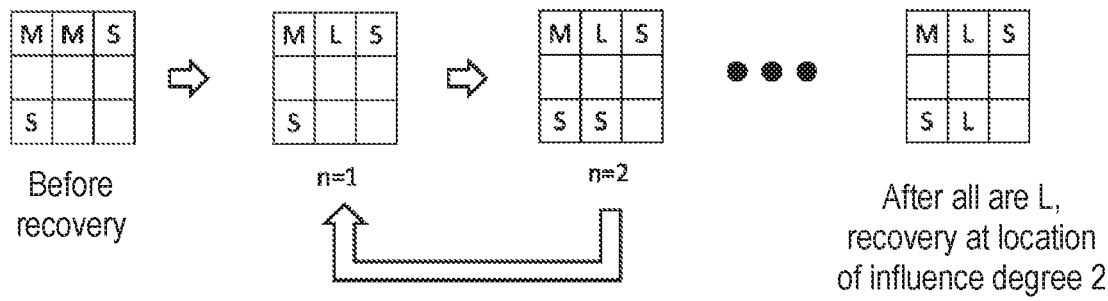
FIG. 11 shows a specific example of a process for increasing the dot size with respect to the ejection position within the recovery range.
Figure 11:
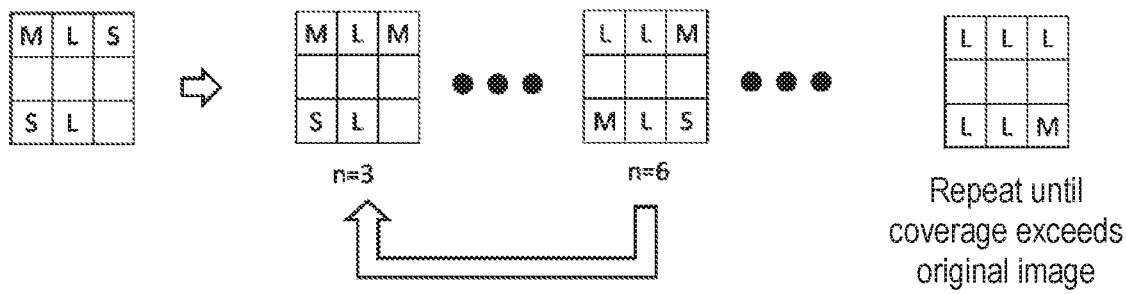

More specifically, for example, it is conceivable to perform the operation described with reference to FIG. 10 as shown in FIG. 11. FIG. 11 shows a specific example of the process for increasing the dot size with respect to the ejection position within the recovery range. In the case shown in FIG. 11, all the dots formed at the ejection positions where the influence degree is 1 are changed to L dots, and the size of the dots formed at some ejection positions where the influence degree is 2 is increased.

Now, the experiment and the like conducted by the inventors of the present application in association with the matters described above will be described. As described above, when performing the recovery process in the operation described with reference to FIG. 10, the size of the dot at the ejection position with a lower influence degree is not changed until all the dots formed at the ejection positions with the same influence degree become L dots. In this regard, when considered from the viewpoint of adjusting the coverage, changing the size of the dot in an operation other than the operation shown in FIG. 10 is also conceivable. It is actually conceivable to adopt an operation other than the operation shown in FIG. 10 depending on the quality and the like required for printing. However, the inventors of the present application have confirmed that the recovery process can be performed particularly appropriately by using the operation shown in FIG. 10 by conducting various experiments and the like.

More specifically, the inventors of the present application conducted an experiment of comparing the following algorithms 1 to 3 with respect to the manner of increasing the size of the dots within the recovery range. 1. Preferentially increase the size of the dot at the blank ejection position. 2. After the ejection position with the same influence degree is filled with the L dot, increase the size of the dot at the ejection position of the next influence degree. 3. Consider both influence degree and dot size. In this case, the operation shown in FIG. 10 corresponds to the second operation. Furthermore, the third operation can be considered as an operation combining the first operation and the second operation (hybrid of 1 and 2). In the experiment, the recovery range was scanned according to these three types of algorithms to perform the process for selecting the ejection position for increasing the dot size, and increasing the dot size.

Figure 12A:
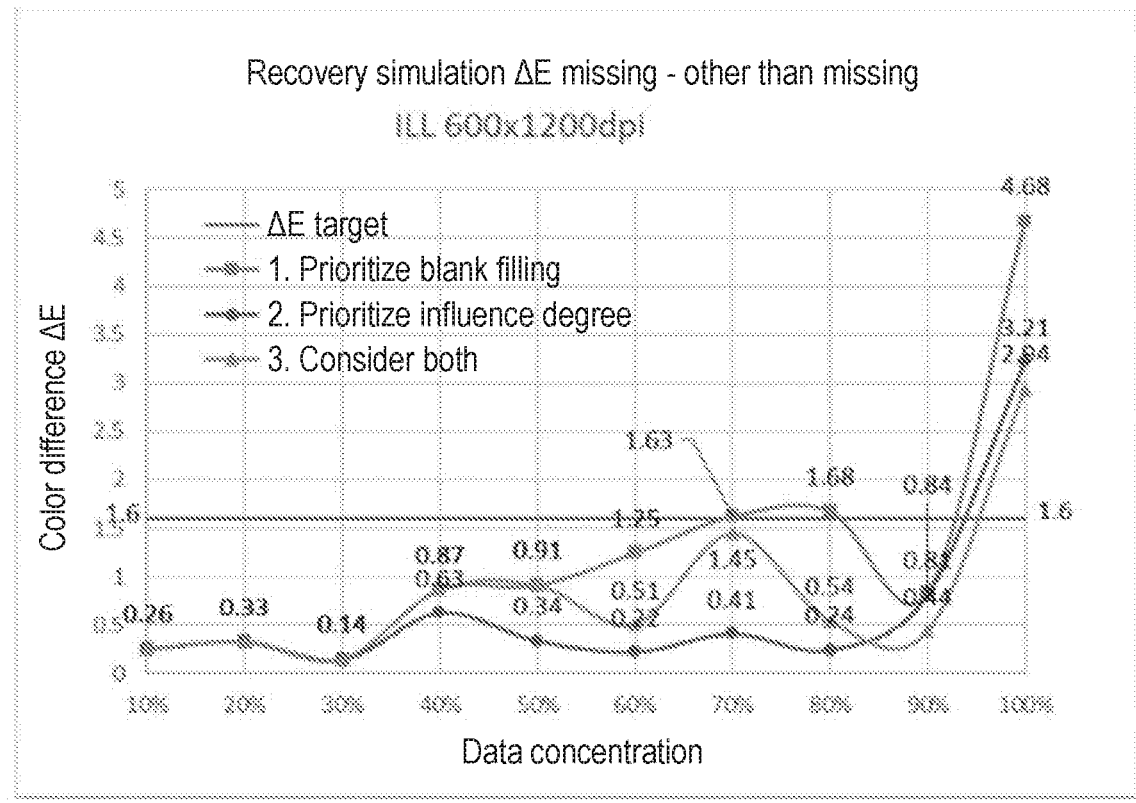
FIGS. 12A and 12B are views showing the results of experiments conducted by the inventors of the present application.
Figure 12B:
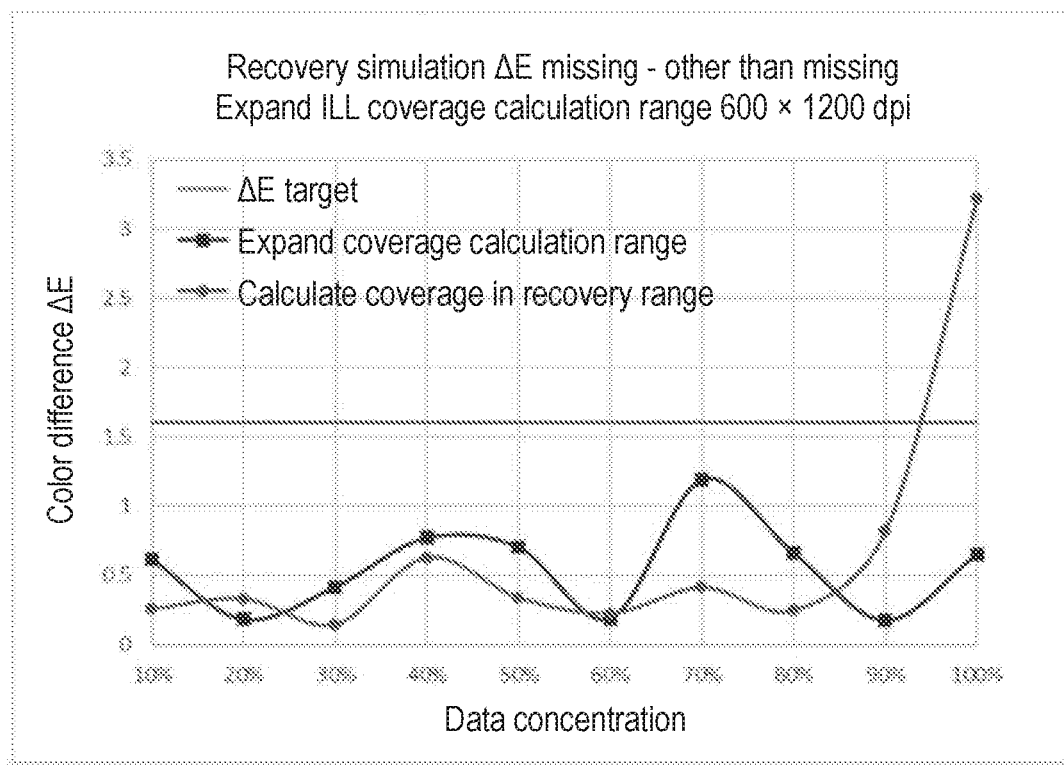

FIGS. 12A and 12B show the results of experiments conducted by the inventors of the present application. FIG. 12A is a graph showing an example of the relationship between the manner of increasing the dot size and the printing result, and shows the color difference between the vicinity of the position where nozzle is missing and the other positions in association with each algorithm in relation to the result of performing the recovery process using the above first to third algorithms. Further, the result shown in FIG. 12A can be considered as, for example, a result indicating the difference in image quality by the order of selecting the ejection position for increasing the size of the dot. From the results shown in the figure, it can be seen that, for example, when the size of the dot is increased by the second algorithm, the color difference is minimized.

Furthermore, as described above, in the present example, the recovery process is performed using the coverage calculation range larger than the recovery range. Moreover, in this regard, the inventors of the present application further conducted an experiment of comparing the results of the recovery process for a case where the coverage is calculated using the coverage calculation range larger than the recovery range and a case where the coverage calculation range is the same as the recovery range (case where the coverage is calculated in the recovery range).

FIG. 12B is a graph showing the results of an experiment on the coverage calculation range. Furthermore, in the figure, the result indicated as the expansion of the coverage calculation range is the result for a case where the coverage calculation range larger than the recovery range is used. Moreover, the result indicated as the coverage calculation in the recovery range is the result for a case where the coverage calculation range is the same as the recovery range. Furthermore, in FIG. 12B, the result of comparing the color difference of the vicinity of the position where nozzle is missing and other positions is shown. From the results shown in the figure, for example, it can be understood that the color difference can be appropriately reduced by using the coverage calculation range larger than the recovery range. Furthermore, the reason why such a result is obtained is considered to be that, for example, the recovery process can be performed in consideration of the concentration around the recovery range by expanding the range for calculating the coverage.

Next, supplementary description regarding the matters described above, description on a modified example, and the like will be made. In the above description, a case where the operation in one pass is performed has been mainly described regarding the operation of the printing apparatus 10. However, in a modified example of the printing apparatus 10, for example, printing through a multi-pass method may be performed. In this case as well, the recovery process can be appropriately performed in the same or similar manner as described above by using the influence degree matrix or the like. Furthermore, as described above, in the printing apparatus 10, it is also conceivable to use, for example, an ultraviolet-curable ink as the ink. In this case, it is also conceivable to perform printing through a multi-pass method using an ultraviolet-curable ink. In such a case, it is considered preferable to perform the recovery process through the method of the present example, instead of the conventional recovery process using the operation through the multi-pass method. More specifically, when printing is performed by the multi-pass method, conventionally, the recovery process is performed through a method of ejecting ink with respect to the original ejection position of the abnormal nozzle in each main scan from the other nozzles in the other main scan. However, in this case, a change also occurs in the timing at which the ink lands on the original ejection position of the abnormal nozzle. In addition, in the case of using the ultraviolet-curable ink, when a change occurs in the timing of landing, an unintended stripe or the like may be generated due to an influence of a difference in the curing timing with the surrounding ink. In the case of using the ultraviolet-curable ink, in order to prevent the occurrence of such stripes and the like, for example, even if the printing operation itself is performed through the multi-pass method, the recovery process is preferably performed in the same main scan. Therefore, in the case of using the ultraviolet-curable ink, it is particularly preferable to perform the recovery process as in the present example.

Furthermore, as described above, in the present example, the printing apparatus 10 performs the printing operation through the serial method. However, in the modified example of the printing apparatus 10, the printing apparatus 10 may perform the printing operation through the line method. In this case, the printing operation through the line method is, for example, an operation of performing printing using an inkjet head capable of simultaneously ejecting ink to the entire width direction of the printing range in a medium. Furthermore, the printing operation through the line method can also be considered as, for example, an operation in which printing is performed by performing only the scanning operation corresponding to the main scan, instead of performing the main scan and the sub scan. In this case, for example, the operation of ejecting ink from the inkjet head while moving the inkjet head relative to the medium by conveying the medium can be considered as an example of the main scan.

Furthermore, various modifications may be further made on the configuration of the printing apparatus 10 and the like. More specifically, for example, a part of the process performed by the control unit 30 of the printing apparatus 10 may be performed by a computer or the like external to the printing apparatus 10. Furthermore, it is also conceivable to use a storage device external to the printing apparatus 10 as the storage 22. In these cases, the printing system including the device external to the printing apparatus 10 can be considered as an example of the liquid ejecting device.

Furthermore, as described above, in the present example, the printing apparatus 10 is an inkjet printer that draws a two-dimensional image on the medium by ejecting the ink to the medium. However, in the modified example of the printing apparatus 10, it is also conceivable to use, as the printing apparatus 10, a 3D printer (3D printing apparatus, shaping device) or the like that shapes a stereoscopic shaped object. Furthermore, in this case, a shaping table that supports a shaped object being shaped and a shaped object being shaped can be considered as objects to which the ink is to be ejected. In this case as well, the influence of the presence of an abnormal nozzle can be more appropriately suppressed by performing the recovery process in the same manner as described above. Furthermore, in this case, the 3D printer can be considered as an example of the liquid ejecting device.

INDUSTRIAL APPLICABILITY

The present disclosure can be suitably used, for example, in a printing apparatus.

What is claimed is:

1. A liquid ejecting device that ejects liquid through an inkjet method, the liquid ejecting device comprising:
   an inkjet head having a plurality of nozzles arranged with positions in a predetermined nozzle row direction shifted from each other;
   a scanning driving unit that causes the inkjet head to perform a main scan of ejecting the liquid while relatively moving in a main scanning direction that intersects the nozzle row direction with respect to a liquid ejecting target;
   an influence degree storage that stores influence degree information indicating an influence degree that occurs among a plurality of ejection positions where the liquid is ejected in one main scan; and
   a control unit that controls operations of the inkjet head and the scanning driving unit,
   wherein
   the influence degree storage stores, as the influence degree information, information indicating a magnitude of an influence generated at one ejection position by forming dots of the liquid at each of a plurality of ejection positions in a periphery of the one ejection position in association with each of the plurality of ejection positions in the periphery,
   when an abnormal nozzle, which is the nozzle having an abnormal ejection characteristic, is present, the control unit causes other nozzles to eject a larger amount of liquid than at a normal time when the abnormal nozzle is not present with respect to at least a part of the ejection position where the liquid is ejected by the other nozzles in a vicinity of the abnormal nozzle at the time of main scan,
   the control unit selects an ejection position to which the other nozzle ejects a larger amount of the liquid than the normal time based on the influence degree information stored in the influence degree storage,
   the influence degree information is information associating one of a plurality of types of influence degrees that differ in the magnitude of influence with each of a plurality of ejection positions in a periphery of the one ejection position, as the magnitude of the influence generated at the one ejection position,
   when an abnormal nozzle is present, the control unit is configured to preferentially select, based on the influence degree information, an ejection position associated with an influence degree that indicates a larger influence, from the plurality of ejection positions in the periphery of the ejection position to which the liquid is ejected by the abnormal nozzle, and to cause the other nozzles to eject a larger amount of liquid than at the normal time to the selected ejection position,
   if the nozzles other than the abnormal nozzle among N (where N is an integer greater than or equal to two) nozzles arranged continuously and including the abnormal nozzle in a nozzle row in which the plurality of nozzles are arranged are used as the other nozzles in the vicinity of the abnormal nozzle, and if the ejection positions of the N nozzles lined up continuously are taken as a recover range, then a range that is wider than the recovery range in the direction along which the nozzle row is arranged is set as a coverage calculation range, and
   when a total amount of ink ejected within the coverage calculation range in the main scanning direction by M (where M is an integer greater than N) nozzles arranged continuously and including the abnormal nozzle in the nozzle row is defined as an in-range total ejection amount, the in-range total ejection amount of the coverage calculation range at the normal time is defined as a normal time ejection amount, and the in-range total ejection amount of the coverage calculation range in a state where the amount of liquid to be ejected by the other nozzles when the abnormal nozzle is present is adjusted is defined as a post-adjustment ejection amount, the control unit calculates the amount of the liquid to be ejected by the other nozzles in accordance with the influence degree so that the post-adjustment ejection amount approaches the normal time ejection amount, and repeats this calculation until the post-adjustment ejection amount is within a predetermined range of the normal time ejection amount.

2. The liquid ejecting device according to claim 1, wherein
the inkjet head changes a volume of the liquid to be ejected from the nozzle in a plurality of stages, and
the control unit changes a stage corresponding to the volume of the liquid to be ejected by the other nozzle to an ejection position where the ejection amount of the liquid is to be increased to a stage corresponding to a larger volume to cause the other nozzle to eject a larger amount of liquid than at the normal time.

3. The liquid ejecting device according to claim 1, wherein
the influence degree information includes, as a plurality of ejection positions each associated with any one of the influence degrees in the influence degree information,
a plurality of ejection positions associated with a first influence degree which is the influence degree indicating a largest influence among the plurality of types of the influence degree, and
an ejection position associated with a second influence degree indicating an influence smaller than the first influence degree,
when the abnormal nozzle is present, the control unit preferentially selects an ejection position associated with the first influence degree among a plurality of ejection positions in the periphery of the ejection position where the liquid is ejected by the abnormal nozzle based on the influence degree information, and changes a stage indicating a volume of the liquid to be ejected to at least a part of the ejection position associated with the first influence degree to a larger stage than at the normal time, and
when the volume of the liquid to be ejected to all the ejection positions associated with the first influence degree is changed to a maximum stage, and the volume of the liquid to be ejected to other ejection positions is further increased, the control unit changes a stage indicating a volume of the liquid to be ejected to at least a part of the ejection position associated with the second influence degree to a larger stage than at the normal time.

4. The liquid ejecting device according to claim 1, wherein
the influence degree storage further stores priority information indicating priority of selection with respect to a plurality of ejection positions associated with the same influence degree, and
when the abnormal nozzle is present, the control unit selects, based on the priority information, an ejection position to which the other nozzle ejects the liquid in an amount larger than at the normal time.

5. The liquid ejecting device according to claim 4, wherein
when an ejection position to which the liquid should have been ejected when the abnormal nozzle is a normal nozzle is defined as an abnormal nozzle corresponding position, when the abnormal nozzle is present, the control unit performs, with respect to each of a plurality of the abnormal nozzle corresponding positions, a recovery process for determining an amount of liquid to be ejected by the other nozzle in a larger amount than in the normal time with respect to the ejection positions in the periphery of the abnormal nozzle corresponding position, and
the control unit changes a manner of selecting the ejection position performed based on the priority information every time the recovery process corresponding to a preset number of abnormal nozzle corresponding positions is performed.

6. The liquid ejecting device according to claim 1, wherein the scanning driving unit causes the inkjet head to perform the main scan to perform one main scan with respect to each position of the liquid ejecting target.

7. The liquid ejecting device according to claim 1, wherein
the liquid is an ink used for printing, and
the liquid ejecting device is a printing apparatus that performs printing by ejecting ink to a medium.

8. A liquid ejecting device that ejects liquid through an inkjet method, the liquid ejecting device comprising:
an inkjet head having a plurality of nozzles arranged with positions in a predetermined nozzle row direction shifted from each other;
a scanning driving unit that causes the inkjet head to perform a main scan of ejecting the liquid while relatively moving in a main scanning direction that intersects the nozzle row direction with respect to a liquid ejecting target; and
a control unit that controls operations of the inkjet head and the scanning driving unit,
wherein
when an abnormal nozzle, which is a nozzle having an abnormal ejection characteristic, is present, the control unit causes other nozzles to eject a larger amount of liquid than at a normal time when the abnormal nozzle is not present with respect to at least a part of the ejection position where the liquid is ejected by the other nozzles in the vicinity of the abnormal nozzle at the time of main scan,
a nozzle other than the abnormal nozzle among N (N is an integer greater than or equal to two) nozzles arranged continuously including the abnormal nozzle in a nozzle row in which the plurality of nozzles are arranged is used as the other nozzle in the vicinity of the abnormal nozzle,
when a total amount of ink ejected within a predetermined range in the main scanning direction by M (M is an integer greater than N) nozzles arranged continuously including the abnormal nozzle in the nozzle row is defined as an in-range total ejection amount, the in-range total ejection amount at the normal time is defined as a normal time ejection amount, and the in-range total ejection amount in a state the amount of liquid to be ejected by the other nozzle when the abnormal nozzle is present is adjusted is defined as a post-adjustment ejection amount, the control unit adjusts the amount of the liquid to be ejected by the other nozzle so that the post-adjustment ejection amount approaches the normal time ejection amount,
the liquid ejecting device further comprises a priority rank storage that stores an order of performing an ejection of the larger amount of liquid by the other nozzles with respect to the at least the part of the ejection position where the liquid is ejected by the other nozzles in the vicinity of the abnormal nozzle at the time of main scan, and
the control unit causes the other nozzles in the vicinity of the abnormal nozzle to eject the larger amount of liquid with respect to the at least the part of the ejection position in the order stored in the priority rank storage.

* * * * *